(12) United States Patent
Teraya et al.

(10) Patent No.: US 10,065,629 B2
(45) Date of Patent: Sep. 4, 2018

(54) HYBRID VEHICLE, CONTROLLER FOR HYBRID VEHICLE, AND CONTROL METHOD FOR HYBRID VEHICLE WITH A CHANGE OF THE SWITCHING CONDITIONS FROM A DEPLETING MODE TO A SUSTAINING MODE

(71) Applicant: TOYOTA JIDOSHA KABUSHIKI KAISHA, Toyota-shi, Aichi-ken (JP)

(72) Inventors: Ryuta Teraya, Okazaki (JP); Toshikazu Kato, Toyota (JP); Yoshikazu Asami, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 234 days.

(21) Appl. No.: 15/033,706

(22) PCT Filed: Nov. 3, 2014

(86) PCT No.: PCT/IB2014/002324
§ 371 (c)(1),
(2) Date: May 2, 2016

(87) PCT Pub. No.: WO2015/068012
PCT Pub. Date: May 14, 2015

(65) Prior Publication Data
US 2017/0282893 A1 Oct. 5, 2017

(30) Foreign Application Priority Data
Nov. 8, 2013 (JP) ................... 2013-232171

(51) Int. Cl.
*B60W 20/13* (2016.01)
*B60K 6/24* (2007.10)
(Continued)

(52) U.S. Cl.
CPC ............... *B60W 20/13* (2016.01); *B60K 6/24* (2013.01); *B60W 10/06* (2013.01);
(Continued)

(58) Field of Classification Search
CPC .. B60W 20/13; B60W 10/06; B60W 2510/06; B60W 2710/06; F02D 13/0223;
(Continued)

(56) References Cited

U.S. PATENT DOCUMENTS

2004/0118367 A1  6/2004  Ezaki et al.
2011/0190968 A1*  8/2011  Fleming ................. G06F 19/00
                                                                701/22
(Continued)

FOREIGN PATENT DOCUMENTS

JP  9-242519  9/1997
JP  2004-183610  7/2004
(Continued)

*Primary Examiner* — Mary D Cheung
(74) *Attorney, Agent, or Firm* — Finnegan, Henderson, Farabow, Garrett & Dunner LLP

(57) ABSTRACT

A hybrid vehicle includes an internal combustion engine, an electrical storage device, a rotary electric machine, and a controller. The hybrid vehicle travels in a selected one of a charge sustaining mode and a charge depleting mode. Switching from the charge depleting mode to the charge sustaining mode is controlled such that a first state of charge is higher than a second state of charge. In the first state of charge, the controller switches from the charge depleting mode to the charge sustaining mode at the time when operation characteristic of the intake valve is unchangeable to a desired operation characteristic. In the second state of charge there is switching from the charge depleting mode to the charge sustaining mode at the time when the operation characteristic of the intake valve is changeable to a desired operation characteristic.

11 Claims, 14 Drawing Sheets

(51) Int. Cl.
   *B60W 10/06* (2006.01)
   *F02D 13/02* (2006.01)
(52) U.S. Cl.
   CPC ..... *F02D 13/0223* (2013.01); *B60W 2510/06* (2013.01); *B60W 2710/06* (2013.01); *B60Y 2200/92* (2013.01); *B60Y 2300/182* (2013.01); *B60Y 2400/442* (2013.01); *Y10S 903/905* (2013.01); *Y10S 903/93* (2013.01)
(58) Field of Classification Search
   CPC ............................. B60K 6/24; B60Y 2200/92; B60Y 2400/442; B60Y 2300/182; Y10S 903/93; Y10S 903/905
   See application file for complete search history.

(56) References Cited

U.S. PATENT DOCUMENTS

| | | | | |
|---|---|---|---|---|
| 2012/0016547 | A1* | 1/2012 | Aridome | B60K 6/365 701/22 |
| 2012/0065819 | A1* | 3/2012 | Christman | B60W 10/06 701/22 |
| 2012/0132163 | A1 | 5/2012 | Shoji et al. | |
| 2012/0209462 | A1 | 8/2012 | Roos et al. | |
| 2012/0310458 | A1 | 12/2012 | Nawata et al. | |
| 2013/0190958 | A1* | 7/2013 | Izumi | B60W 20/20 701/22 |
| 2013/0261859 | A1* | 10/2013 | Sugimoto | B60W 20/40 701/22 |
| 2014/0172206 | A1* | 6/2014 | Roos | B60K 6/442 701/22 |
| 2015/0002053 | A1* | 1/2015 | Endo | B60L 11/1803 318/139 |

FOREIGN PATENT DOCUMENTS

| | | |
|---|---|---|
| JP | 2008-25550 | 2/2008 |
| JP | 2009-202662 | 9/2009 |
| JP | 2010-215183 | 9/2010 |
| JP | 2012-117376 | 6/2012 |
| JP | 2013-53610 | 3/2013 |
| JP | 2013-060056 A | 4/2013 |
| JP | 2013-119293 A | 6/2013 |
| JP | 2013-129380 | 7/2013 |
| WO | WO 2012/13194 A1 | 10/2012 |

* cited by examiner

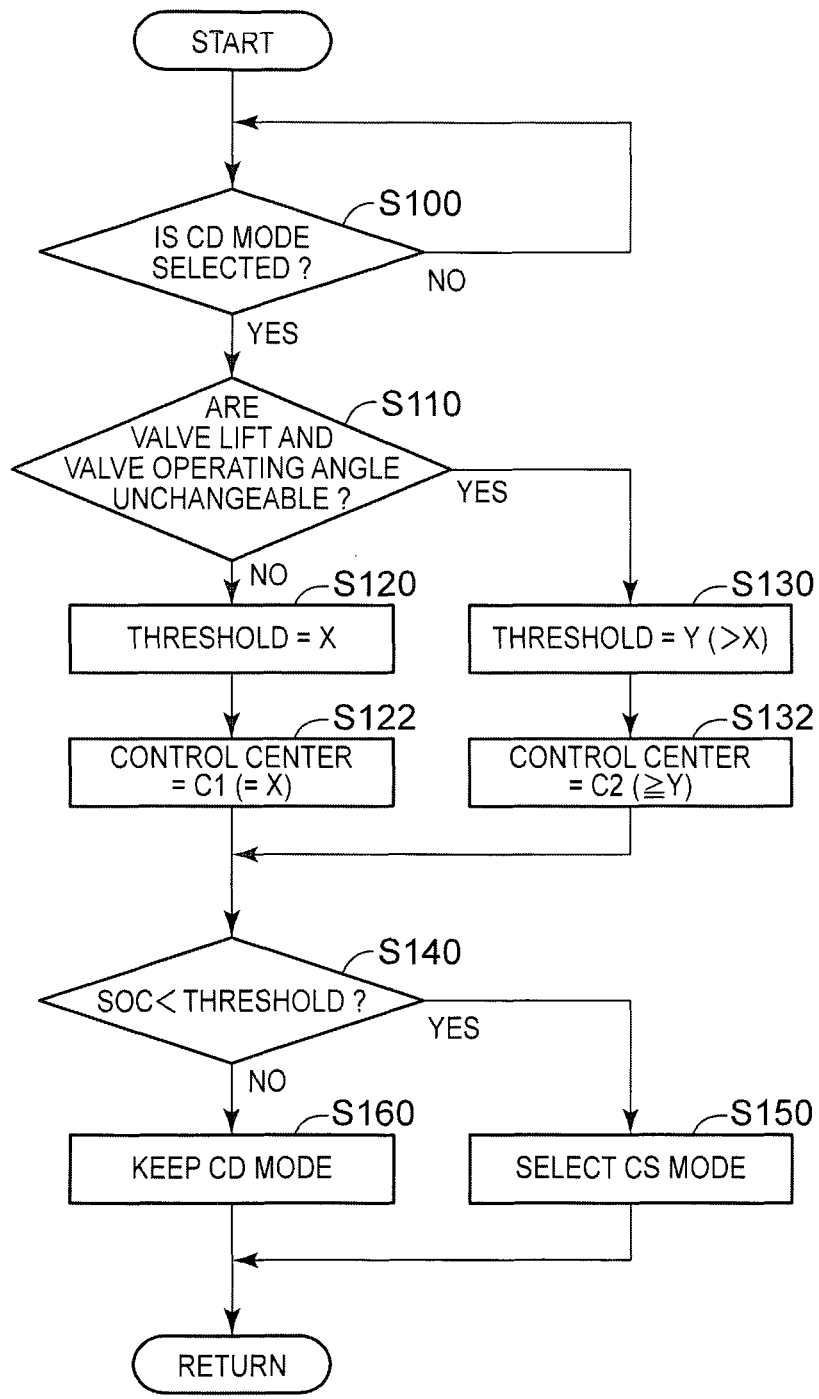

HYBRID VEHICLE, CONTROLLER FOR HYBRID VEHICLE, AND CONTROL METHOD FOR HYBRID VEHICLE WITH A CHANGE OF THE SWITCHING CONDITIONS FROM A DEPLETING MODE TO A SUSTAINING MODE

CROSS-REFERENCE TO RELATED APPLICATIONS

This application is a national phase application of International Application No. PCT/IB2014/002324, filed Nov. 3, 2014, and claims the priority of Japanese Application No. 2013-232171, filed Nov. 8, 2013, the content of both of which is incorporated herein by reference.

BACKGROUND OF THE INVENTION

1. Field of the Invention

The invention relates to a hybrid vehicle, a controller for a hybrid vehicle, and a control method for a hybrid vehicle and, more particularly, to a hybrid vehicle including an internal combustion engine.

2. Description of Related Art

Generally, there is known a variable valve actuating device for changing the operation characteristic of an intake valve of an internal combustion engine. There is a variable valve actuating device configured to be able to change at least one of the valve lift or valve operating angle of an intake valve (see, for example, Japanese Patent Application Publication No. 2009-202662 (JP 2009-202662 A), Japanese Patent Application Publication No. 2004-183610 (JP 2004-183610 A), Japanese Patent Application Publication No. 2013-53610 (JP 2013-53610 A), Japanese Patent Application Publication No. 2008-25550 (JP 2008-25550 A), Japanese Patent Application Publication No. 2012-117376 (JP 2012-117376 A) and Japanese Patent Application Publication No. 9-242519 (JP 9-242519 A)). It is possible to change the operating characteristic of the internal combustion engine with the variable valve actuating device.

For example, JP 2009-202662 A describes a hybrid vehicle including a variable valve actuating device. In this hybrid vehicle, when the variable, valve actuating device is diagnosed a failure, stop of an internal combustion engine is prohibited, and a motor-assisted drive mode is executed. In the motor-assisted drive mode, the hybrid vehicle travels by using power of both the internal combustion engine and a motor. As a result, it is possible to ensure traveling performance while avoiding a start-up failure of the internal combustion engine.

There is known a hybrid vehicle that travels while switching between modes (see, for example, Japanese Patent Application Publication No. 2013-129380 (JP 2013-129380 A) and International Application Publication No. 2012/131941). The modes include a charge depleting (CD) mode and a charge sustaining (CS) mode. In the CD mode, the state of charge (SOC) of an electrical storage device is consumed. In the CS mode, the SOC is kept. In this hybrid vehicle, the CD mode is selected until the SOC decreases to a predetermined level, and then the CS mode is selected.

SUMMARY OF THE INVENTION

When the operation characteristic of an intake valve becomes unchangeable because of a failure of the variable valve actuating device, or the like, it is not possible to appropriately adjust the operation characteristic of the intake valve in response to an operating condition of the internal combustion engine. Therefore, the output of the internal combustion engine may decrease. At this time, an electric power supplied from the electrical storage device to the motor is increased with a decrease in the output of the internal combustion engine. Therefore, it is difficult to keep the SOC when the CS mode is selected. Thus, there is a possibility that traveling performance is not ensured as a result of a decrease in SOC while the hybrid vehicle is traveling in the CS mode.

The invention is to ensure traveling performance when the operation characteristic of an intake valve is unchangeable to a desired operation characteristic in a hybrid vehicle including a variable valve actuating device for changing the operation characteristic of the intake valve.

An aspect of the invention provides a hybrid vehicle. The hybrid vehicle includes an internal combustion engine, an electrical storage device, a rotary electric machine and a controller. The internal combustion engine includes a variable valve actuating device. The variable valve actuating device is configured to change an operation characteristic of an intake valve. The electrical storage device is configured to be charged. The rotary electric machine is configured to generate driving force for propelling the hybrid vehicle by using electric power that is supplied from the electrical storage device. The controller is configured to cause the hybrid vehicle to travel in a selected one of a charge sustaining (CS) mode and a charge depleting (CD) mode. The CS mode is a mode in which an SOC of the electrical storage device is kept within a predetermined range. The CD mode is a mode in which consumption of the SOC is given a higher priority as compared to the CS mode. The controller is configured to change a switching condition for switching from the CD mode to the CS mode such that a first SOC is higher than a second SOC. The first SOC is an SOC at which the controller switches from the CD mode to the CS mode at the time when the operation characteristic of the intake valve is unchangeable to a desired operation characteristic. The second SOC is an SOC at which the controller switches from the CD mode to the CS mode at the time when the operation characteristic of the intake valve is changeable to a desired operation characteristic.

When the operation characteristic of the intake valve is unchangeable to a desired operation characteristic, the controller switches to the CS mode at a higher SOC. Therefore, consumption of the SOC in the CD mode is suppressed. Thus, it is possible to suppress deterioration of traveling performance due to a decrease in SOC. Thus, with the hybrid vehicle including the variable valve actuating device for changing the operation characteristic of the intake valve, traveling performance is ensured at the time when the operation characteristic of the intake valve is unchangeable to a desired operation characteristic.

In the above aspect, the controller may be configured to, when the SOC decreases to a predetermined SOC at the time when the CD mode is selected, switch from the CD mode to the CS mode. The controller may be configured to set the predetermined SOC such that the predetermined SOC at the time when the operation characteristic of the intake valve is unchangeable to a desired operation characteristic is higher than the predetermined SOC at the time when the operation characteristic of the intake valve is changeable to a desired operation characteristic.

With this configuration, when the operation characteristic of the intake valve is unchangeable to a desired operation characteristic, the controller switches to the CS mode at a higher SOC. Thus, it is possible to suppress deterioration of traveling performance due to a decrease in SOC.

In the above aspect, the controller may be configured to, when the operation characteristic of the intake valve becomes unchangeable to a desired operation characteristic at the time when the CD mode is selected, switch from the CD mode to the CS mode.

With the above configuration, the CS mode is immediately selected when the operation characteristic of the intake valve is unchangeable to a desired operation characteristic. Therefore, it is possible to suppress consumption of the SOC in the CD mode.

In the above aspect, the controller may be configured to change the switching condition for switching from the CD mode to the CS mode so as to, when the variable valve actuating device has a failure, switch from the CD mode to the CS mode at the first SOC. And, the controller may be configured to, when the variable valve actuating device is normal, switch from the CD mode to the CS mode at the second SOC.

With the above configuration, traveling performance is ensured in the case where the variable valve actuating device has a failure.

In the above aspect, the controller may be configured to set the predetermined range such that the predetermined range at the time when the operation characteristic of the intake valve is unchangeable to a desired operation characteristic is wider than the predetermined range at the time when the operation characteristic of the intake valve is changeable to a desired operation characteristic.

With the above configuration, when the operation characteristic of the intake valve is unchangeable to a desired operation characteristic, it is possible to allow fluctuations in SOC as compared to when the operation characteristic of the intake valve is changeable to a desired operation characteristic. Therefore, it is possible to more easily utilize the driving force of the rotary electric machine for propelling the hybrid vehicle. Thus, it is possible to flexibly carry out retreat traveling in which the hybrid vehicle travels in a state where the output of the internal combustion engine has decreased.

In the above aspect, the controller may be configured to set a center of the predetermined range such that the center of the predetermined range at the time when the operation characteristic of the intake valve is unchangeable to a desired operation characteristic is higher than or equal to the SOC at which the controller switches from the CD mode to the CS mode at the time when the operation characteristic of the intake valve is changeable to a desired operation characteristic.

With the above configuration, it is possible to keep the SOC in the CS mode higher. As a result, it is possible to suppress deterioration of traveling performance by compensating for a decrease in the output of the internal combustion engine with the driving force of the rotary electric machine for propelling the hybrid vehicle.

In the above aspect, the variable valve actuating device may be configured to change the operation characteristic of the intake valve to any one of a first characteristic, a second characteristic and a third characteristic. At least one of a valve lift of the intake valve or a valve operating angle in the second characteristic may be larger than the corresponding at least one of a valve lift of the intake valve or a valve operating angle of the intake valve in the first characteristic. At least one of a valve lift or a valve operating angle of the intake valve in the third characteristic may be larger than the corresponding at least one of the valve lift and the valve operating angle of the intake valve in the second characteristic.

With the above configuration, the operation characteristic, that is, the valve lift and valve operation angle, of the intake valve is limited to three characteristics. Therefore, it is possible to reduce a time that is required to adapt control parameters for controlling the operating state of the engine. In addition, it is possible to simplify the configuration of the actuator.

In the above aspect, the controller may be configured to, when the operation characteristic of the intake valve is unchangeable to the first characteristic or the third characteristic at the time when the CD mode is selected, switch from the CD mode to the CS mode.

There is a region in which the output of the internal combustion engine is easy to decrease when the operation characteristic of the intake valve is unchangeable from one of the first characteristic and the third characteristic to a desired operation characteristic. Thus, the CS mode is selected only when the operation characteristic of the intake valve is unchangeable from one of the first characteristic and the third characteristic to a desired operation characteristic. Therefore, it is possible to suppress excessive limitations on travel of the hybrid vehicle in the CD mode.

The variable valve actuating device may be configured to change the operation characteristic of the intake valve to one of a first characteristic and a second characteristic. At least one of a valve lift of the intake valve or a valve operating angle of the intake valve in the second characteristic may be larger than the corresponding at least one of a valve lift of the intake valve or a valve operating angle of the intake valve in the first characteristic.

With the above configuration, the operation characteristic, that is, the valve lift and valve operating angle, of the intake valve is limited to two characteristics. Therefore, it is possible to further reduce a time that is required to adapt control parameters for controlling the operating state of the engine. In addition, it is possible to further simplify the configuration of the actuator.

Another aspect of the invention provides a controller for a hybrid vehicle. The hybrid vehicle includes an internal combustion engine, an electrical storage device, and a rotary electric machine. The internal combustion engine includes a variable valve actuating device. The variable valve actuating device is configured to change an operation characteristic of an intake valve. The electrical storage device is configured to be charged. The rotary electric machine is configured to generate driving force for propelling the hybrid vehicle by using electric power that is supplied from the electrical storage device. The controller includes a mode control unit and a traveling control unit. The-mode control unit is configured to change a switching condition for switching from the CD mode to the CS mode such that a first SOC is higher than a second SOC. The first SOC is an SOC at which the controller switches from the CD mode to the CS mode at the time when the operation characteristic of the intake valve is unchangeable to a desired operation characteristic. The second SOC is an SOC at which the controller switches from the CD mode to the CS mode at the time when the operation characteristic of the intake valve is changeable to a desired operation characteristic. The mode control unit is configured to select one of the CS mode and the CD mode. The traveling control unit is configured to cause the hybrid vehicle to travel in the mode selected by the mode control unit. The CS mode is a mode in which an SOC of the electrical storage device is kept within a predetermined range. The CD mode is a mode in which consumption of the SOC is given a higher priority as compared to the CS mode.

Further another aspect of the invention provides a control method for a hybrid vehicle. The hybrid vehicle includes an internal combustion engine, an electrical storage device, a rotary electric machine, and a controller. The internal combustion engine includes a variable valve actuating device. The variable valve actuating device is configured to change an operation characteristic of an intake valve. The electrical storage device is configured to be charged. The rotary electric machine is configured to generate driving force for propelling the hybrid vehicle by using electric power that is supplied from the electrical storage- device. The control method includes changing a switching condition for switching from the CD mode to the CS mode such that a first SOC is higher than a second SOC. The first SOC is an SOC at which the controller switches from the CD mode to the CS mode at the time when the operation characteristic of the intake valve is unchangeable to a desired operation characteristic. The second SOC is an SOC at which the controller switches from the CD mode to the CS mode at the time when the operation characteristic of the intake valve is changeable to a desired operation characteristic. The control method includes causing, by the controller, the hybrid vehicle to travel in a selected one of the CS mode and the CD mode. The CS mode is a mode in which an SOC of the electrical storage device is kept within a predetermined range. The CD mode is a mode in which consumption of the SOC is given a higher priority as compared to the CS mode.

According to the invention, traveling performance when the operation characteristic of an intake valve is unchangeable to a desired operation characteristic is ensured in a hybrid vehicle including a variable valve actuating device for changing the operation characteristic of the intake valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 18 is a flowchart that shows the control structure of traveling control that is executed by a controller according to a third alternative embodiment to the embodiment of the invention.

DETAILED DESCRIPTION OF EMBODIMENTS

Figure 1:
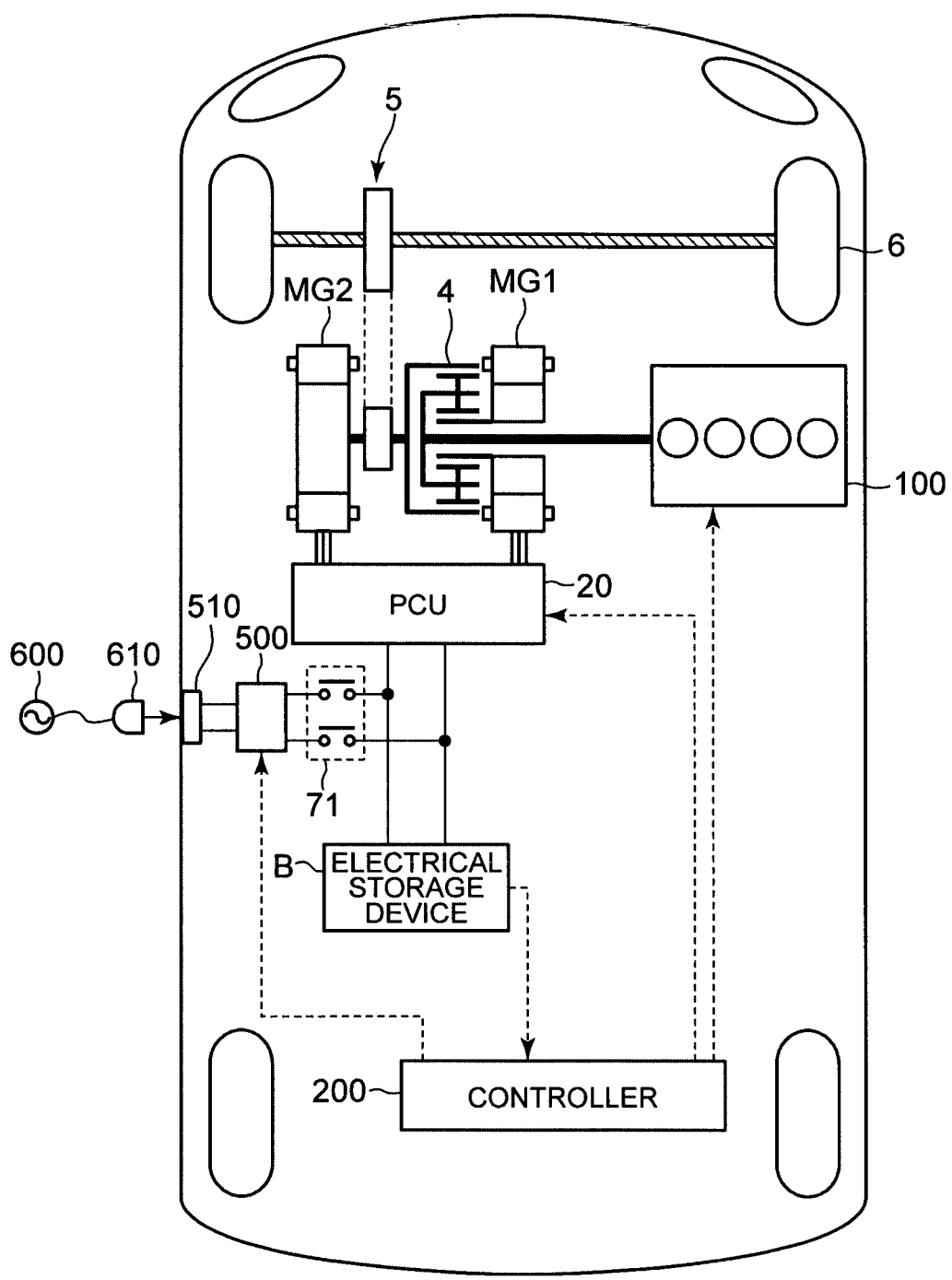
FIG. 1 is a block diagram that shows the overall configuration of a hybrid vehicle according to an embodiment of the invention.

Hereinafter, an embodiment of the invention will be described in detailed with reference to the accompanying drawings. Like reference numerals denote the same or corresponding portions in the drawings, and the description thereof will not be repeated.

FIG. 1 is a block diagram that shows the overall configuration of a hybrid vehicle according to the embodiment of the invention. As shown in FIG. 1, the hybrid vehicle 1 includes an engine 100, motor generators MG1, MG2, a power split device 4, a reduction gear 5, drive wheels 6, an electrical storage device B, a power control unit (PCU) 20, and a controller 200.

The hybrid vehicle 1 is a so-called plug-in hybrid vehicle. That is, the hybrid vehicle 1 is able to travel by using driving force that is output from at least one of the engine 100 and the motor generator MG2, and is able to charge the electrical storage device B with electric power that is supplied from a system power supply 600 outside the vehicle. In the following description, the power supply outside the vehicle is also termed "external power supply", and charging of the electrical storage device B from the external power supply is also termed "external charging".

The engine 100 and the motor generators MG1, MG2 are coupled to one another via the power split device 4. Driving force that is generated by the engine 100 is split by the power split device 4 into two paths. One of the paths is a path through which driving force is transmitted to the drive wheels 6 via the reduction gear 5. The other one of the paths is a path through which driving force is transmitted to the motor generator MG1.

The electrical storage device B is an electric power storage element configured to be rechargeable. The electrical storage device B is configured to include a secondary battery, such as a lithium ion battery, a nickel-metal hydride battery and a lead storage battery, or a cell of an electrical storage element, such as an electric double layer capacitor. The electrical storage device B is connected to the PCU 20 for driving the motor generators MG1, MG2. The electrical storage device B supplies the PCU 20 with electric power for generating the driving force of the hybrid vehicle 1. The electrical storage device B stores electric power generated by the motor generators MG1, MG2. The output of the electrical storage device B is, for example, 200 V. The electrical storage device B detects the voltage, current and temperature of the electrical storage device B, and outputs those detected values to the controller 200.

The PCU 20 converts direct-current power, which is supplied from the electrical storage device B, to alternating-current power, and drives the motor generators MG1, MG2 by using the alternating-current power. The PCU 20 converts alternating-current power, generated by the motor generators MG1, MG2, to direct-current power, and charges the electrical storage device B with the direct-current power.

The hybrid vehicle 1 further includes a charging device 500, a charging port 510 and a relay 71 as components for carrying out external charging.

The charging port 510 is a power interface for receiving electric power (hereinafter, referred to as "external power") from the system power supply 600 outside the vehicle. The charging port 510 is configured to be connectable to a connector 610. The connector 610 is connected to the system power supply 600 outside the vehicle.

The charging device 500 is provided between the charging port 510 and the electrical storage device B. The charging device 500 is connected to the electrical storage device B via the relay 71. The charging device 500, on the basis of a control signal from the controller 200, converts (alternating-current) external power input to the charging port 510 to (direct-current) electric power that is chargeable into the electrical storage device B, and outputs the converted electric power to the electrical storage device B. Thus, the electrical storage device B is charged with external power.

The controller 200 executes various controls on the basis of various sensor outputs. The various controls include control over the mode of the hybrid vehicle 1, determination as to whether the engine 100 is started up or stopped, charge/discharge control over the electrical storage device B, and the like. The controller 200 generates a control command value for controlling the PCU 20, and outputs the generated control command value to the PCU 20. The controller 200 generates a control command value for controlling the engine 100, and outputs the generated control command value to the engine 100. In external charging, the controller. 200 generates a signal for driving the charging device 500, and outputs the generated signal to the charging device 500.

Figure 2:
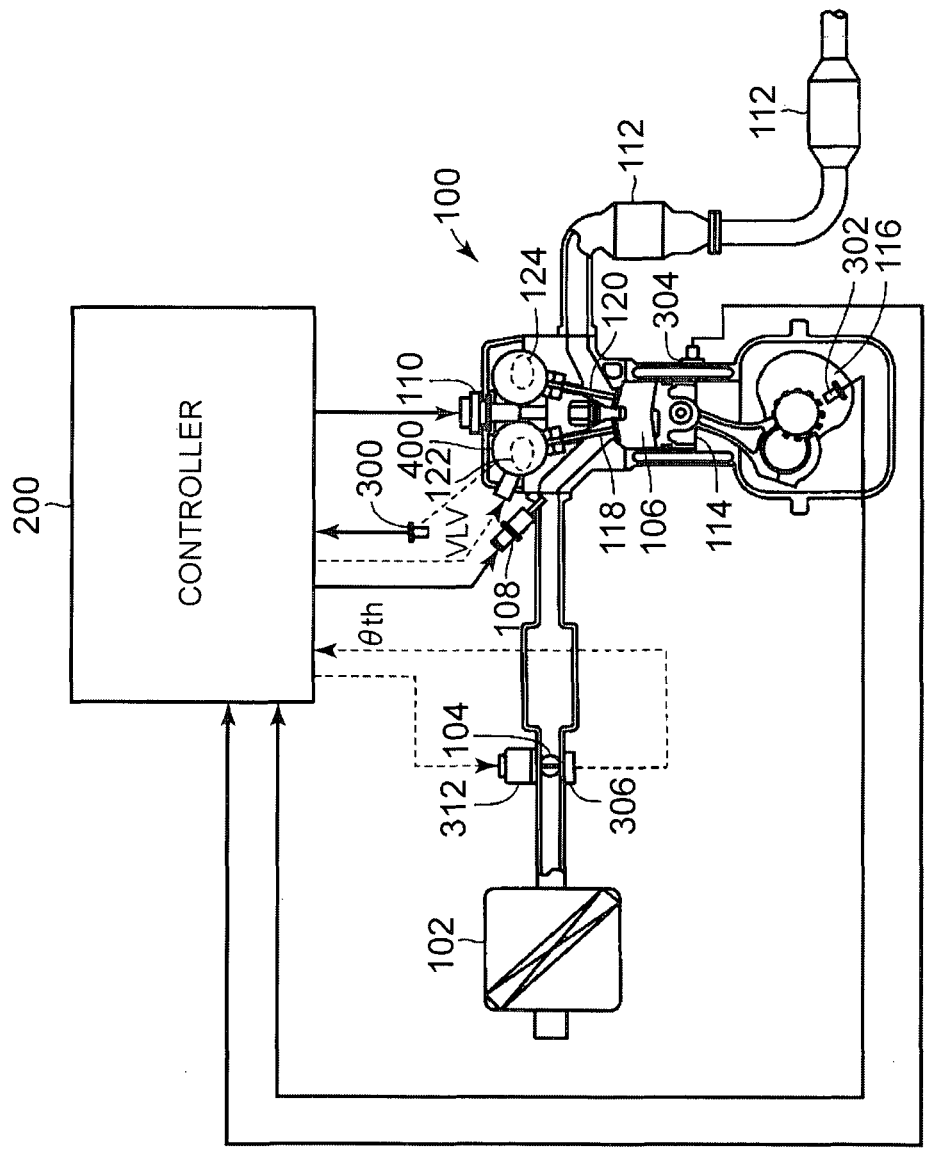
FIG. 2 is a view that shows the configuration of an engine shown in FIG. 1.

FIG. 2 is a view that shows the configuration of the engine 100 shown in FIG. 1. As shown in FIG. 2, air is taken into the engine 100 through an air cleaner 102. An intake air amount is adjusted by a throttle valve 104. The throttle valve 104 is an electrically controlled throttle valve that is driven by a throttle motor 312.

Each injector 108 injects fuel toward a corresponding intake port. Air mixed with fuel in each intake port is introduced into a corresponding cylinder 106.

In the present embodiment, the engine 100 will be described as a port injection-type engine in which an injection hole of each injector 108 is provided in the corresponding intake port. In addition to each port injection injector 108, a direct injection injector that directly injects fuel into the corresponding cylinder 106 may be provided. Furthermore, only a direct injection injector may be provided.

Air-fuel mixture in each cylinder 106 is ignited by a corresponding ignition plug 110 to combust. The combusted air-fuel mixture, that is, exhaust gas, is purified by a three-way catalyst 112, and is then emitted to the outside of the vehicle. A piston 114 is pushed downward by combustion of air-fuel mixture, and a crankshaft 116 rotates.

An intake valve 118 and an exhaust valve 120 are provided at the top portion of each cylinder 106. The amount of air that is introduced into each cylinder 106 and the timing of introduction are controlled by the corresponding intake valve 118. The amount of exhaust gas that is emitted from each cylinder 106 and the timing of emission are controlled by the corresponding exhaust valve 120. Each intake valve 118 is driven by a cam 122. Each exhaust valve 120 is driven by a cam 124.

As will be described in detail later, the valve lift and valve operating angle of each intake valve 118 are controlled by a variable valve lift (VVL) device 400. The valve lift and valve operating angle of each exhaust valve 120 may also be controlled. A variable valve timing (VVT) device that controls the open/close timing may be combined with the VVL device 400.

The controller 200 controls a throttle opening degree θth, an ignition timing, a fuel injection timing, a fuel injection amount, and the operating state (open/close timing, valve lift, valve operating angle, and the like) of each intake valve so that the engine 100 is placed in a desired operating state. Signals are input to the controller 200 from various sensors, that is, a cam angle sensor 300, a crank angle sensor 302, a knock sensor 304 and a throttle opening degree sensor 306.

The cam angle sensor 300 outputs a signal indicating a cam position. The crank angle sensor 302 outputs signals indicating the rotation speed of the crankshaft 116 (engine rotation speed) and the rotation angle of the crankshaft 116. The knock sensor 304 outputs a signal indicating the strength of vibrations of the engine 100. The throttle opening degree sensor 306 outputs a signal indicating the throttle opening degree θth.

Figure 3:
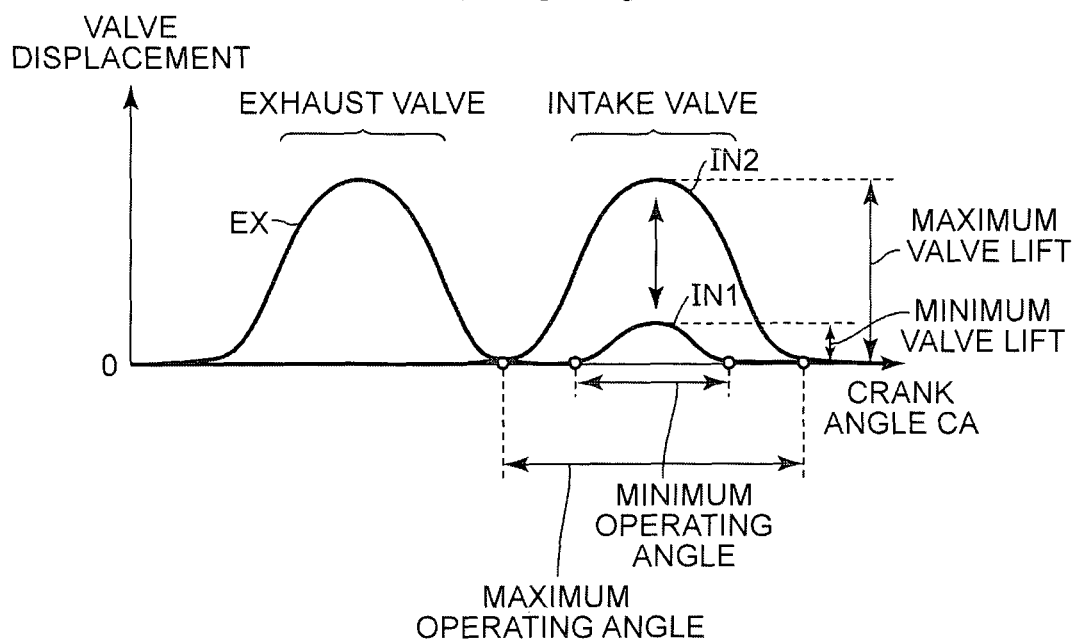
FIG. 3 is a graph that shows the correlation between a crank angle and a valve displacement that is achieved by a VVL device.

FIG. 3 is a graph that shows the correlation between a crank angle and a valve displacement that is achieved by the VVL device 400. As shown in FIG. 3, each exhaust valve 120 opens and closes in an exhaust stroke, and each intake valve 118 opens and closes in an intake stroke. The valve displacement of each exhaust valve 120 is indicated by a waveform EX. The valve displacement of each intake valve 118 is indicated by waveforms IN1, IN2.

The valve displacement is a displacement of each intake valve 118 from a state where the intake valve 118 is closed. The valve lift is a valve displacement at the time when the opening degree of each intake valve 118 has reached a peak. The valve operating angle is a crank angle of a period from when each intake valve 118 opens to when the intake valve 118 closes.

The operation characteristic of each intake valve 118 is changed by the VVL device 400 between the waveforms IN1, 1N2. The waveform IN1 indicates the case where the valve lift and the valve operating angle are minimum. The waveform IN2 indicates the case where the valve lift and the valve operating angle are maximum. In the VVL device 400, the valve operating angle increases with an increase in the valve lift.

Figure 4:
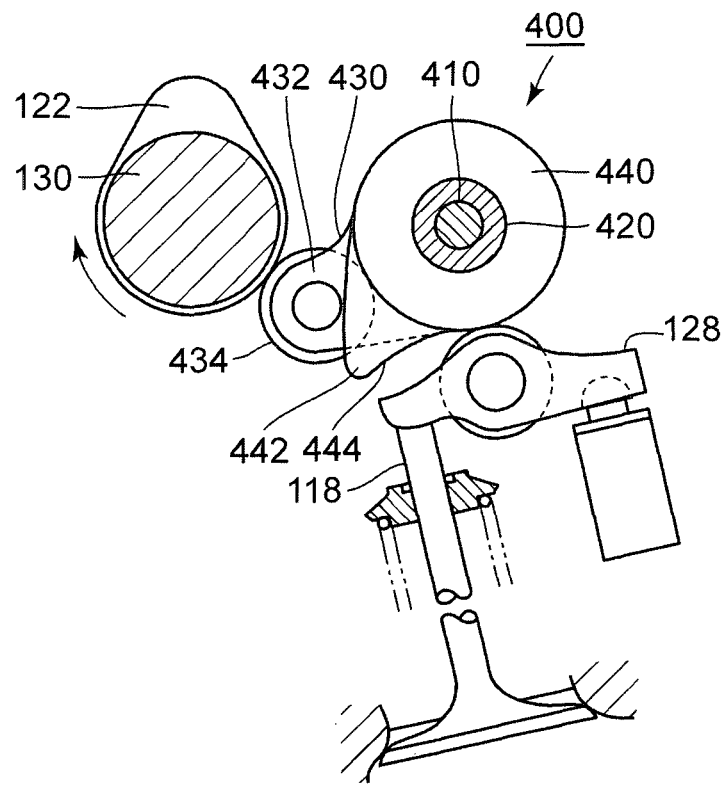
FIG. 4 is a front view of the VVL device that controls the valve lift and valve operating angle of each intake valve.

FIG. 4 is a front view of the VVL device 400 that is one example of a device that controls the valve lift and valve operating angle of each intake valve 118. As shown in FIG. 4, the VVL device 400 includes a drive shaft 410, a support pipe 420, an input arm 430, and oscillation cams 440. The drive shaft 410 extends in one direction. The support pipe 420 covers the outer periphery of the drive shaft 410. The input arm 430 and the oscillation cams 440 are arranged in the axial direction of the drive shaft 410 on the outer periphery of the support pipe 420. An actuator (not shown) that linearly actuates the drive shaft 410 is connected to the distal end of the drive shaft 410.

The VVL device 400 includes the one input arm 430 in correspondence with the one cam 122 provided in each cylinder. The two oscillation cams 440 are provided on both sides of each input arm 430 in correspondence with the pair of intake valves 118 provided for each cylinder.

The support pipe 420 is formed in a hollow cylindrical shape, and is arranged parallel to a camshaft 130. The support pipe 420 is fixed to a cylinder head so as not to be moved in the axial direction or rotated.

The drive shaft 410 is inserted inside the support pipe 420 so as to be slidable in the axial direction. The input arm 430 and the two oscillation cams 440 are provided on the outer periphery of the support pipe 420 so as to be oscillatable about the axis of the drive shaft 410 and not to move in the axial direction.

The input arm 430 includes an arm portion 432 and a roller portion 434. The arm portion 432 protrudes in a direction away from the outer periphery of the support pipe 420. The roller portion 434 is rotatably connected to the distal end of the arm portion 432. The input arm 430 is provided such that the roller portion 434 is arranged at a position at which the roller portion 434 is able to contact the cam 122.

Each oscillation cam 440 has a substantially triangular nose portion 442 that protrudes in a direction away from the outer periphery of the support pipe 420. A concave cam face 444 is formed at one side of the nose portion 442. A roller rotatably attached to a rocker arm 128 is pressed against the cam face 444 by the urging force of a valve spring provided in the intake valve 118.

The input arm 430 and the oscillation cams 440 integrally oscillate about the axis of the drive shaft 410. Therefore, as the camshaft 130 rotates, the input arm 430 that is in contact with the cam 122 oscillates, and the oscillation cams 440 oscillate in interlocking with movement of the input arm 430. The movements of the oscillation cams 440 are transferred to the intake valves 118 via rocker arms 128, and the intake valves 118 are opened or closed.

The VVL device 400 further includes a device that changes a relative phase difference between the input arm 430 and each oscillation cam 440 around the axis of the support pipe 420. The valve lift and valve operating angle of each intake valve 118 are changed as needed by the device that changes the relative phase difference.

That is, when the relative phase difference between the input arm 430 and each oscillation cam 440 is increased, the oscillation angle of each rocker arm 128 is increased with respect to the oscillation angle of each of the input arm 430 and the oscillation cams 440, and the valve lift and valve operating angle of each intake valve 118 are increased.

When the relative phase difference between the input arm 430 and each oscillation cam 440 is reduced, the oscillation angle of each rocker arm 128 is reduced with respect to the oscillation angle of each of the input arm 430 and the oscillation cams 440, and the valve lift and valve operating angle of each intake valve 118 are reduced.

Figure 5:
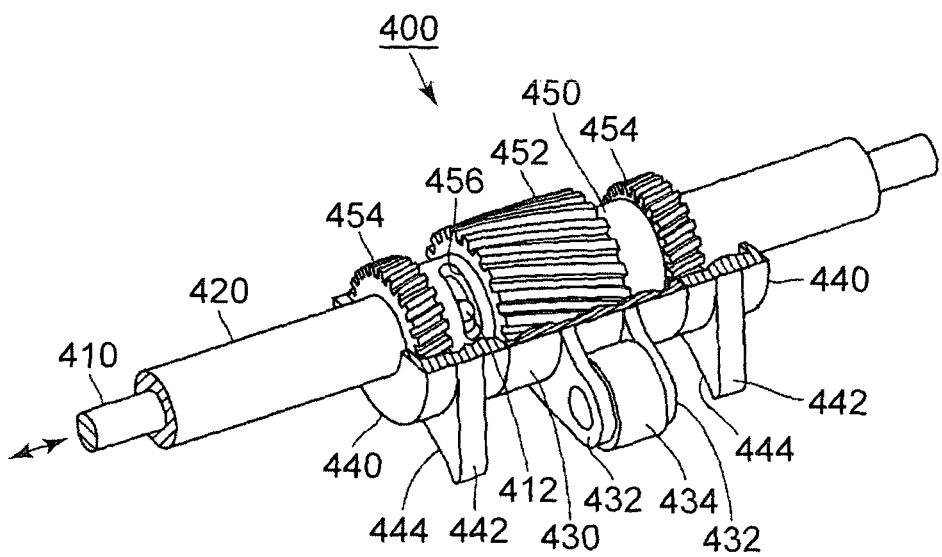
FIG. 5 is a perspective view that partially shows the VVL device.

FIG. 5 is a perspective view that partially shows the VVL device 400. FIG. 5 shows a structure with part cut away so that the internal structure is clearly understood.

As shown in FIG. 5, a slider gear 450 is accommodated in a space defined between the outer periphery of the support pipe 420 and the set of input arm 430 and two oscillation cams 440. The slider gear 450 is supported on the support pipe 420 so as to be rotatable and slidable in the axial direction. The slider gear 450 is provided on the support pipe 420 so as to be slidable in the axial direction.

The slider gear 450 includes a helical gear 452. The helical gear 452 is located at the center portion of the slider gear 450 in the axial direction. Right-handed screw spiral helical splines are formed on the helical gear 452. The slider gear 450 includes helical gears 454. The helical gears 454 are respectively located on both sides of the helical gear 452. Left-handed screw spiral helical splines opposite to those of the helical gear 452 are formed on each of the helical gears 454.

On the other hand, helical splines corresponding to the helical gears 452, 454 are respectively formed on the inner peripheries of the input arm 430 and two oscillation cams 440. The inner peripheries of the input arm 430 and two oscillation cams 440 define a space in which the slider gear 450 is accommodated. That is, the right-handed spiral helical splines are formed on the input arm 430, and the helical splines are in mesh with the helical gear 452. The left-handed spiral helical splines are formed on each of the oscillation cams 440, and the helical splines are in mesh with the corresponding helical gear 454.

An oblong hole 456 is formed in the slider gear 450. The oblong hole 456 is located between the helical gear 452 and one of the helical gears 454, and extends in the circumferential direction. Although not shown in the drawing, an oblong hole is formed in the support pipe 420, and the oblong hole extends in the axial direction so as to partially overlap with the oblong hole 456. A locking pin 412 is integrally provided in the drive shaft 410 inserted inside the support pipe 420. The locking pin 412 protrudes through the overlapped portions of these oblong hole 456 and oblong hole (not shown).

When the drive shaft 410 is moved in the axial direction by the actuator (not shown) coupled to the drive shaft 410, the slider gear 450 is pressed by the locking pin 412, and the helical gears 452, 454 move in the axial direction of the drive shaft 410 at the same time. When the helical gears 452, 454 are moved in this way, the input arm 430 and the oscillation cams 440 spline-engaged with these helical gears 452, 454 do not move in the axial direction. Therefore, the input arm 430 and the oscillation cams 440 pivot around the axis of the drive shaft 410 through meshing of the helical splines.

At this time, the helical splines respectively formed on the input arm 430 and each oscillation cam 440 have opposite orientations. Therefore, the pivot direction of the input arm 430 and the pivot direction of each oscillation cam 440 are opposite to each other. Thus, the relative phase difference between the input arm 430 and each oscillation cam 440 changes, with the result that the valve lift and valve operating angle of each intake valve 118 are changed as is already described. The VVL device is not limited to this type. For example, a VVL device that electrically drives each valve, a VVL device that hydraulically drives each valve, or the like, may be used.

The controller 200 controls the valve lift and valve operating angle of each intake valve 118 by adjusting an operation amount of the actuator that linearly moves the drive shaft 410.

Figure 6:
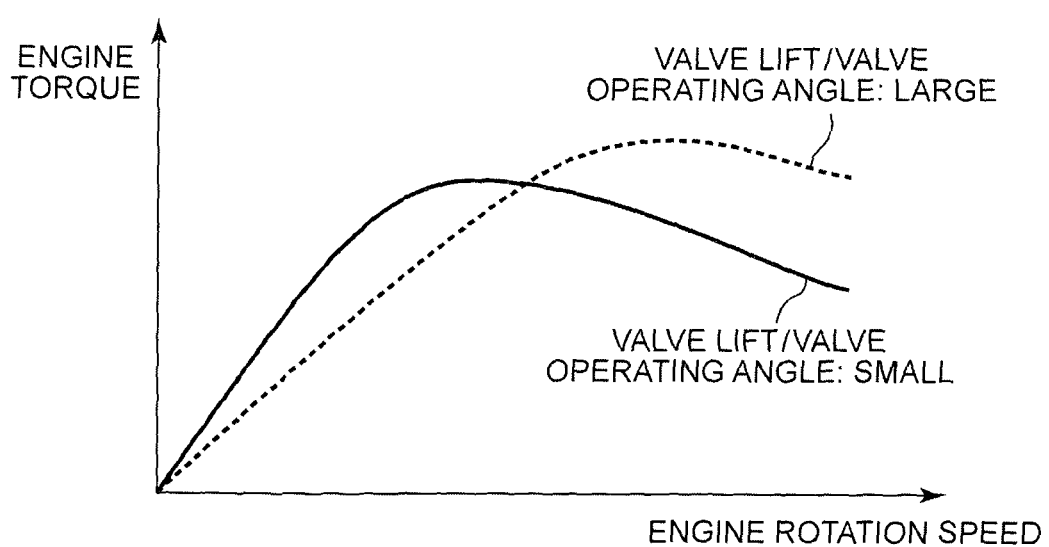
FIG. 6 is a graph that illustrates a difference in engine torque due to the characteristic of each intake valve.

FIG. 6 is a graph that illustrates a difference in engine torque due to the characteristic of each intake valve 118. In FIG. 6, the abscissa axis represents engine rotation speed, and the ordinate axis represents engine torque. In FIG. 6, the continuous line indicates the case where the valve lift and the valve operating angle are small, and the dashed line indicates the case where the valve lift and the valve operating angle are large.

As shown in FIG. 6, in a region in which the engine rotation speed is low, an outputtable engine torque in the case where the valve lift and the valve operating angle are small is larger than the outputtable engine torque in the case where the valve lift and the valve operating angle are large. When the valve lift and the valve operating angle are large, part of air taken into each cylinder is returned to the outside of the cylinder. In contrast, when the valve lift and the valve operating angle are small, each intake valve 118 is early closed, so it is possible to introduce a larger amount of air, with the result that the outputtable torque of the engine 100 increases.

On the other hand, in a region in which the engine rotation speed is high, the outputtable engine torque in the case where the valve lift and the valve operating angle are large is larger than the outputtable engine torque in the case where the valve lift and the valve operating angle are small. This is because it is possible to introduce a larger amount of air by utilizing the inertial force of air in the case where the valve lift and the valve operating angle are large.

Figure 7:
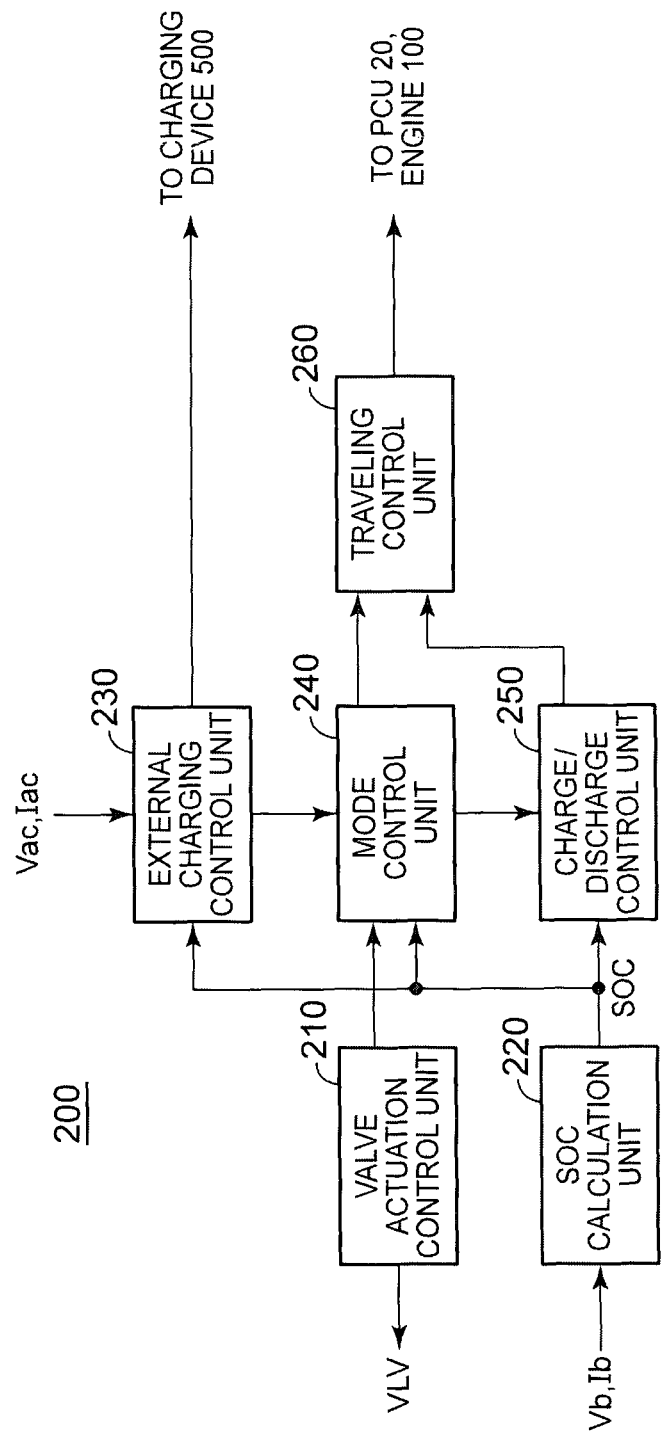
FIG. 7 is a functional block diagram of a controller shown in FIG. 1.

FIG. 7 is a functional block diagram of the controller 200 shown in FIG. 1. The functional blocks shown in the functional block diagram of FIG. 7 are implemented by the controller 200 executing hardware processing or software processing.

As shown in FIG. 7, the controller 200 includes a valve actuation control unit 210, an SOC calculation unit 220, an external charging control unit 230, a mode control unit 240, a charge/discharge control unit 250 and a traveling control unit 260.

The valve actuation control unit 210 controls the VVL device 400 so as to set at least one of the valve lift or valve operating angle of each intake valve 118 in response to the rotation speed and load of the engine 100. The valve actuation control unit 210 outputs, to the VVL device 400, a signal VLV for controlling the VVL device 400.

The valve actuation control unit 210 determines whether the valve lift and valve operating angle of each intake valve 118 are unchangeable. A state where the valve lift and valve operating angle of each intake valve 118 are unchangeable is a state where the valve lift and valve operating angle of each intake valve 118 cannot be changed by the VVL device 400. The state where the valve lift and valve operating angle of each intake valve 118 are unchangeable includes a state where the valve lift and valve operating angle of each intake valve 118 cannot be changed by the VVL device 400 to a desired operation characteristic (for example, an operation characteristic that is required of each intake valve 118).

As an example, when the VVL device 400 fails, the valve actuation control unit 210 is allowed to determine that the valve lift and valve operating angle of each intake valve 118 are unchangeable. When the operation performance of the VVL device 400 decreases because of a decrease in temperature (for example, at an extremely low temperature), the valve actuation control unit 210 may determine that the valve lift and valve operating angle of each intake valve 118 are unchangeable. The valve actuation control unit 210 outputs, to the mode control unit 240, a signal indicating that the valve lift and valve operating angle of each intake valve 118 are unchangeable and a signal indicating the valve lift and valve operating angle of each intake valve 118 of which the valve lift and valve operating angle are unchangeable.

The SOC calculation unit 220 calculates an SOC on the basis of a voltage Vb and current Ib of the electrical storage device B. The voltage Vb and current Ib of the electrical storage device B are detected by sensors (not shown). The SOC indicates the state of charge of the electrical storage device B. The SOC indicates the level of charge to a full charge level of the electrical storage device B in 0 to 100%, and indicates the remaining level of charge of the electrical storage device B. Various known methods may be used as a method of calculating the SOC.

When the external power supply is connected to the charging port 510 (FIG. 1), the external charging control unit 230 generates a control signal for driving the charging device 500 on the basis of an input voltage Vac and an input current Iac that are detected by sensors (not shown), and outputs the control signal to the charging device 500. When the SOC of the electrical storage device B, received from the SOC calculation unit 220, reaches a predetermined upper limit value, the external charging control unit 230 completes charging control, and outputs a charge completion signal indicating completion of charging to the mode control unit 240.

The mode control unit 240 selects the mode of the hybrid vehicle 1 on the basis of the SOC calculated by the SOC calculation unit 220 and the signal received from the valve actuation control unit 210. Specifically, the mode control unit 240 sets one of a CS mode and a CD mode. In the CS mode, the SOC of the electrical storage device B is kept within a predetermined range. In the CD mode, consumption of the SOC is given a higher priority as compared to the CS mode.

Figure 8:
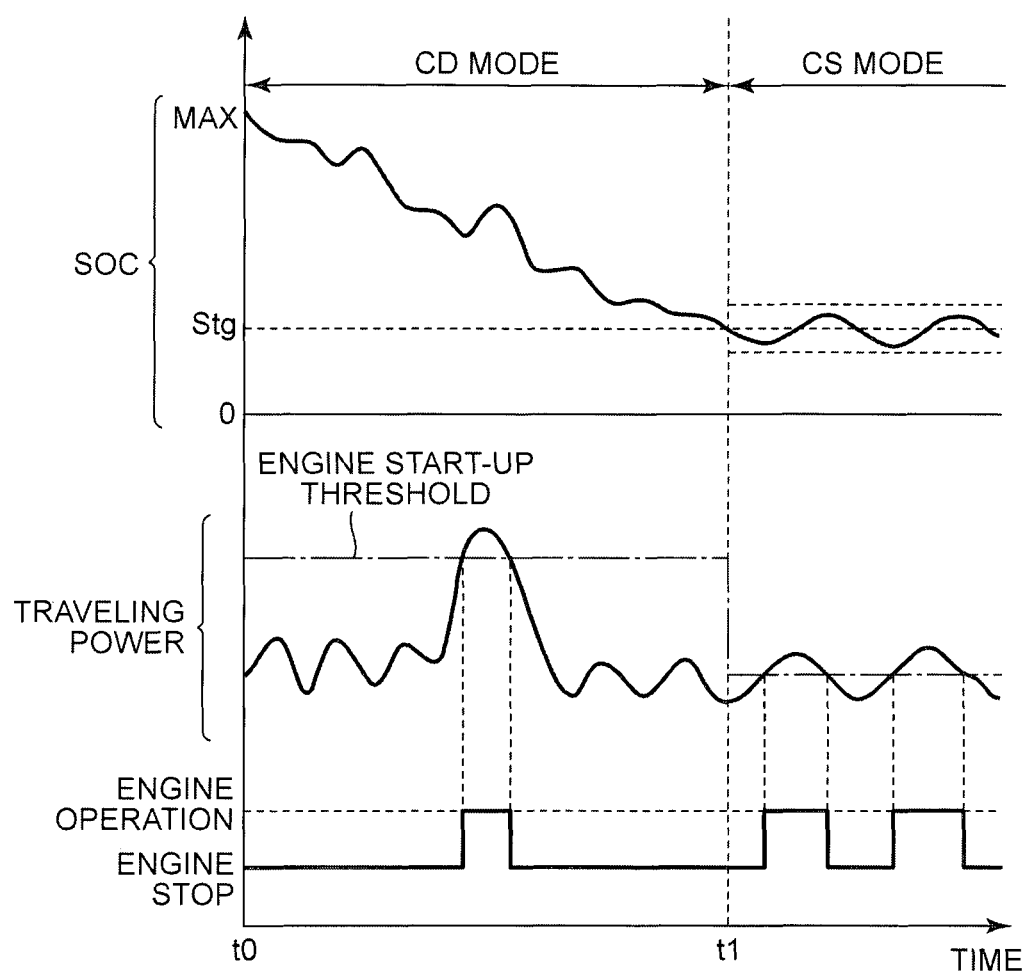
FIG. 8 is a graph for illustrating a CD mode and a CS mode.

FIG. 8 is a graph for illustrating the CD mode and the CS mode. Referring to FIG. 8, it is assumed that, after the electrical storage device B becomes the full charge level (SOC=MAX) as a result of external charging, the hybrid vehicle 1 is caused to start traveling in the CD mode.

The CD mode is a mode in which the SOC is consumed, and, basically, electric power stored in the electrical storage device B (mainly, electric energy through external charging) is consumed in the CD mode. While the hybrid vehicle 1 is traveling in the CD mode, the engine 100 does not operate for the purpose of keeping the SOC. Thus, although the SOC may temporarily increase because of regenerated electric power that is recovered, for example, during deceleration of the vehicle, or electric power that is generated as a result of operation of the engine 100, the ratio of discharge is relatively larger than the ratio of charge eventually, with the result that the SOC decreases with an increase in travel distance as a whole.

The CS mode is a mode in which the SOC is kept within a predetermined range. As an example, at time t1, when the SOC decreases to a predetermined value Stg indicating a decrease in SOC, the CS mode is selected, and the SOC thereafter is kept within the predetermined range. Specifically, the engine 100 operates when the SOC decreases; whereas the engine 100 stops when the SOC increases. That is, in the CS mode, the engine 100 operates in order to keep the SOC. Although not specifically shown in the drawing, a switch that is operable by a driver may be provided and then the mode may be made switchable depending on a driver's intention irrespective of a decrease in SOC.

When a driving power is smaller than a predetermined engine start-up threshold, the hybrid vehicle 1 stops the engine 100 and travels by using the motor generator MG2 (EV mode). On the other hand, when the driving power exceeds the engine start-up threshold, the hybrid vehicle 1 travels by operating the engine 100 (HV mode). In the HV mode, the hybrid vehicle 1 travels by using the driving force of the engine 100 in addition to the driving force of the motor generator MG2 or instead of the driving force of the motor generator MG2. Electric power generated by the motor generator MG1 as a result of the operation of the engine 100 is directly supplied to the motor generator MG2 or stored in the electrical storage device B.

The engine start-up threshold in the CD mode is higher than the engine start-up threshold in the CS mode. That is, a region in which the hybrid vehicle 1 travels in the EV mode in the CD mode is larger than a region in which the hybrid vehicle 1 travels in the EV mode in the CS mode. Thus, in the CD mode, the frequency of start-up of the engine 100 is suppressed. On the other hand, in the CS mode, the hybrid vehicle 1 is controlled so as to efficiently travel by using both the engine 100 and the motor generator MG2.

In the CD mode as well, when the driving power exceeds the engine start-up threshold, the engine 100 operates. Even when the driving power does not exceed the engine start-up threshold, the operation of the engine 100 may be allowed, for example, when hot water heating using the engine 100 as a heat source is required or when the engine 100 is warmed up. On the other hand, in the CS mode as well, the engine 100 stops when the SOC increases. That is, the CD mode is not limited to such an EV mode in which the hybrid vehicle 1 travels while constantly stopping the engine 100, and the CS mode is not limited to such an HV mode in which the hybrid vehicle 1 travels while constantly operating the engine 100. In any of the CD mode and the CS mode, both the EV mode and the HV mode are possible.

Figure 9:
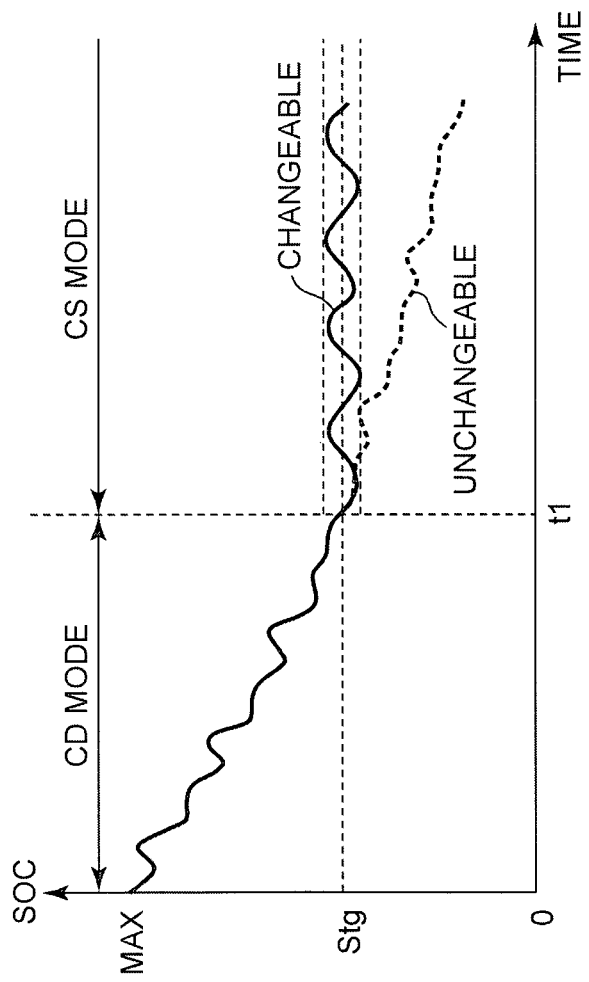
FIG. 9 is a graph that shows an example of a temporal change in the SOC of an electrical storage device according to a comparative embodiment.

FIG. 9 is a graph that shows an example of a temporal change in the SOC of an electrical storage device according to a comparative embodiment. Referring to FIG. 9, the continuous line shows an example of a temporal change in SOC when the operation characteristic of each intake valve 118 is changeable, and the dashed line shows an example of a temporal change in SOC when the operation characteristic of each intake valve 118 is unchangeable.

When the operation characteristic of each intake valve 118 is changeable, the SOC is kept near the predetermined value Stg in the CS mode. On the other hand, when the operation characteristic of each intake valve 118 is unchangeable because of a failure, or the like, the SOC may not be able to be kept near the predetermined value Stg in the CS mode.

Specifically, when the operation characteristic of each intake valve 118 becomes unchangeable because of a failure, or the like, the output of the engine 100 may decrease. For example, as shown in FIG. 6, torque outputtable at a low rotation speed side in the case where the valve lift and valve operating angle of each intake valve 118 are large is smaller than that in the case where the valve lift and valve operating angle of each intake valve 118 are small. On the other hand, torque outputtable at a high rotation speed side in the case where the valve lift and valve operating angle of each intake valve 118 are small is smaller than that in the case where the valve lift and valve operating angle of each intake valve 118 are large.

In this case, because electric power supplied from the electrical storage device B to the motor generator MG2 is increased because of a decrease in the output of the engine 100, it is difficult to keep the SOC when the CS mode is selected. Thus, there is a possibility that traveling performance is not ensured because of a decrease in the SOC to near a lower limit while the hybrid vehicle 1 is traveling in the CS mode.

In the present embodiment, the following control is executed. When at least one of the valve lift or valve operating angle of each intake valve 118 is unchangeable, a switching condition for switching from the CD mode to the CS mode is changed so as to more easily switch to the CS mode as compared to when the corresponding at least one of the valve lift or valve operating angle of each intake valve 118 is changeable. Thus, traveling performance is ensured by increasing the SOC at the time when the CS mode is started.

Figure 10:
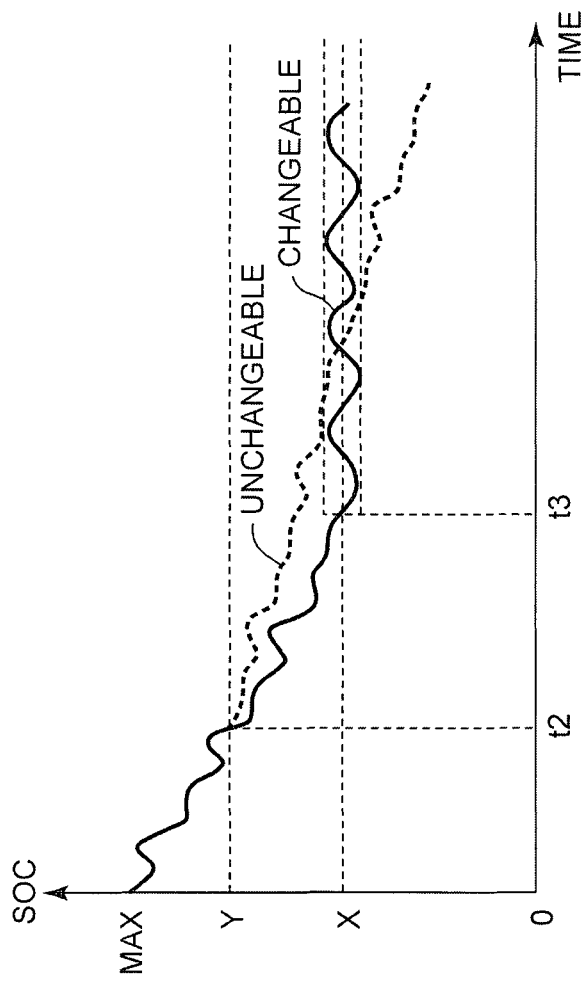
FIG. 10 is a graph that shows an example of a temporal change in the SOC of an electrical storage device according to the embodiment.

Specifically, as shown in FIG. 10, when at least one of the valve lift or valve operating angle of each intake valve 118 is changeable while the hybrid vehicle 1 is traveling in the CD mode, the mode control unit 240 selects the CS mode when the SOC becomes lower than a predetermined value X. On the other hand, when the corresponding at least one of the valve lift or valve operating angle of each intake valve 118 is unchangeable while the hybrid vehicle 1 is traveling in the CD mode, the mode control unit 240 selects the CS mode when the SOC becomes lower than a predetermined value Y higher than the predetermined value X. The mode control unit 240 outputs a signal indicating the selected mode to the charge/discharge control unit 250 and the traveling control unit 260.

The charge/discharge control unit 250 receives the SOC of the electrical storage device B from the SOC calculation unit 220, and receives the signal indicating the mode from the mode control unit 240. When the CS mode is selected, the charge/discharge control unit 250 controls the charge/discharge amount of the electrical storage device B on the basis of these signals so that the SOC is kept at a predetermined target value.

Specifically, the charge/discharge control unit 250 calculates a required charge/discharge amount of the electrical storage device B so as to keep the SOC at the predetermined value X when at least one of the valve lift or valve operating angle of each intake valve 118 is changeable, and the charge/discharge control unit 250 calculates a required charge/discharge amount of the electrical storage device B so as to keep the SOC at the predetermined value Y when the corresponding at least one of the valve lift or valve operating angle of each intake valve 118 is unchangeable. The charge/discharge control unit 250 outputs the calculated required charge/discharge amount to the traveling control unit 260.

The traveling control unit 260 controls the PCU 20 and the engine 100 on the basis of the mode, the required charge/discharge amount and a required driving force from the driver. Specifically, when the mode is the CD mode, the SOC is not kept, so, basically, the motor generator MG2 is driven by energy output from the electrical storage device B on the basis of the required driving force.

On the other hand, when the mode is the CS mode, the output of the engine 100 and the output of the electrical storage device B are controlled so as to keep the SOC. Specifically, the traveling control unit 260 calculates a required engine power on the basis of the required charge/discharge amount and the required driving force. The traveling control unit 260 controls the engine 100 on the basis of the required engine power, and controls the output of the motor generator MG2 on the basis of the required driving force.

Figure 11:
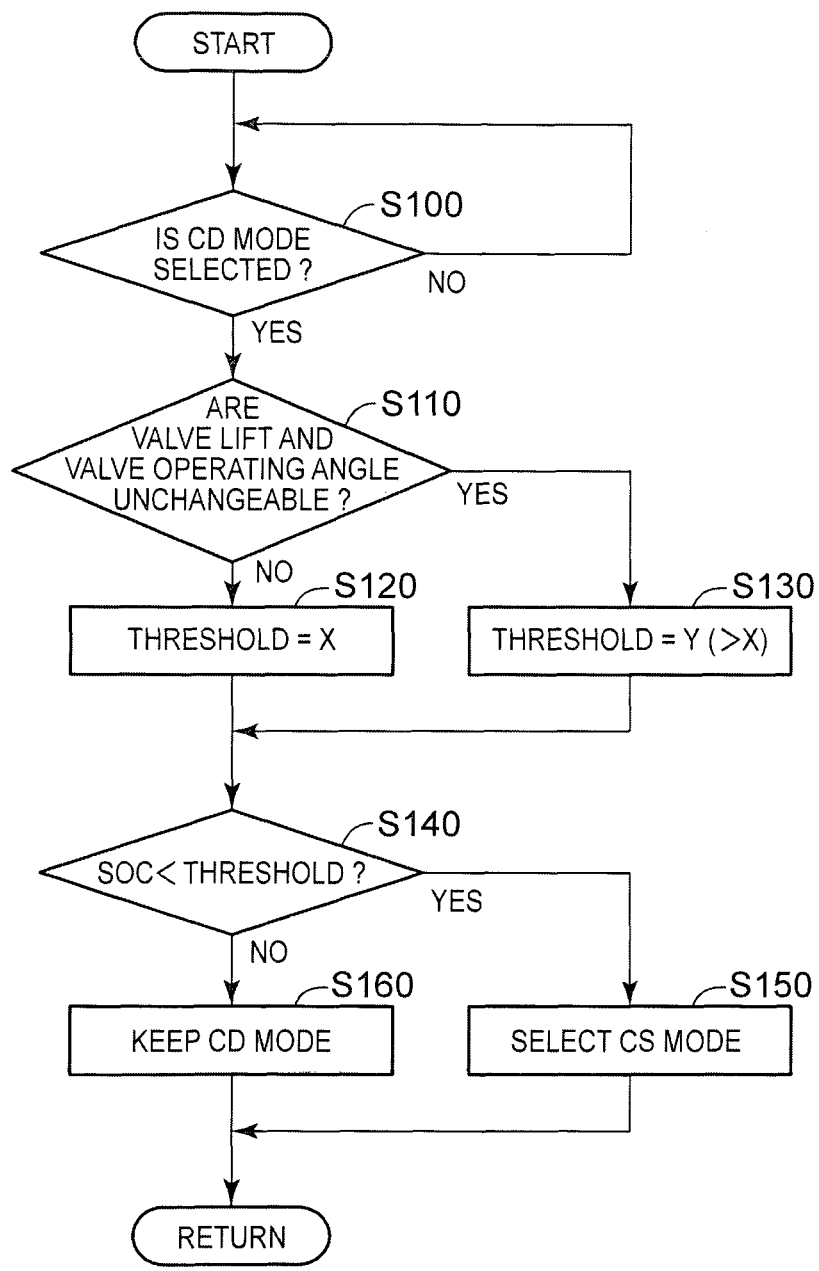
FIG. 11 is a flowchart that shows the control structure of traveling control that is executed by the controller shown in FIG. 1.

FIG. 11 is a flowchart that shows the control structure of traveling control that is executed by the controller 200 shown in FIG. 1. The flowchart shown in FIG. 11 is implemented by executing a program, prestored in the controller 200, at predetermined intervals. Alternatively, the process of part of steps may be implemented by constructing exclusive hardware (electronic circuit) (the same applies to the flowcharts shown in FIG. 14 and FIG. 16 that will be described later).

As shown in FIG. 11, the controller 200 determines in step (hereinafter, step is abbreviated as "S") 100 whether the CD mode is selected. When it is determined that the CD mode is not selected (NO in S100), the controller 200 waits until the CD mode is selected.

When it is determined that the CD mode is selected (YES in S100), the controller 200 determines whether the valve lift and valve operating angle of each intake valve 118 is unchangeable (S110). When it is determined that the valve lift and valve operating angle of each intake valve 118 is changeable (NO in S110), the controller 200 sets the predetermined value X for a threshold for switching from the CD mode to the CS mode (S120). When it is determined that the valve lift and valve operating angle of each intake valve 118 are unchangeable (YES in S110), the controller 200 sets the predetermined value Y higher than the predetermined value X for the threshold for switching from the CD mode to the CS mode (S130).

Subsequently, in S140, the controller 200 determines whether the SOC of the electrical storage device B is lower than the threshold. When it is determined that the SOC of the electrical storage device B is lower than the threshold (YES in S140), the controller 200 selects the CS mode (S150). When it is determined that the SOC of the electrical storage device B is higher than or equal to the threshold (NO in S140), the controller 200 keeps the CD mode (S160).

As described above, in this embodiment, when at least one of the valve lift or valve operating angle of each intake valve 118 is unchangeable, the switching condition for switching from the CD mode to the CS mode is changed so that the controller 200 switches from the CD mode to the CS mode at an SOC higher than that when the corresponding at least one of the valve lift or valve operating angle of each intake valve 118 is changeable. When at least one of the valve lift or valve operating angle of each intake valve 118 is unchangeable, there is a possibility that the output of the engine 100 decreases. When the output of the engine 100 decreases, the driving force of the motor generator MG2 for propelling the hybrid vehicle 1 increases in order to satisfy a required driving force for propelling the hybrid vehicle 1. Thus, electric power that is supplied from the electrical storage device B to the motor generator MG2 increases, so there is a possibility that it is not possible to keep the SOC in the CS mode.

When at least one of the valve lift or valve operating angle of each intake valve 118 is unchangeable, the controller 200 switches to the CS mode at a higher SOC, so consumption of the SOC in the CD mode is suppressed. Thus, it is possible to suppress deterioration of traveling performance due to a decrease in SOC. Thus, according to this embodiment, in the hybrid vehicle including the variable valve actuating device for changing the operation characteristic of each intake valve 118, traveling performance is ensured in the case where the operation characteristic of each intake valve 118 is unchangeable to a desired operation characteristic.

In this embodiment, when the SOC decreases to a predetermined SOC in the case where the CD mode is selected, the controller 200 switches from the CD mode to the CS mode, and the controller 200 sets the predetermined SOC such that the predetermined SOC at the time when at least one of the valve lift or valve operating angle of each intake valve 118 is unchangeable is higher than the predetermined SOC at the time when the corresponding at least one of the valve lift or valve operating angle of each intake valve 118 is changeable. Thus, when at least one of the valve lift or valve operating angle of each intake valve 118 is unchangeable, the mode is switched to the CS mode at a higher SOC. Thus, it is possible to suppress deterioration of traveling performance due to a decrease in SOC.

In this embodiment, when the VVL device 400 has a failure, the controller 200 may change the switching condition for switching from the CD mode to the CS mode such that the controller 200 switches from the CD mode to the CS mode at an SOC higher than an SOC at which the controller 200 switches from the CD mode to the CS mode at the time when the VVL device 400 is normal. In this case, traveling performance is ensured in the case where the VVL device 400 has a failure.

The valve lift and valve operating angle of each intake valve 118 may be changed continuously (steplessly) or may be changed discretely (stepwisely).

Figure 12:
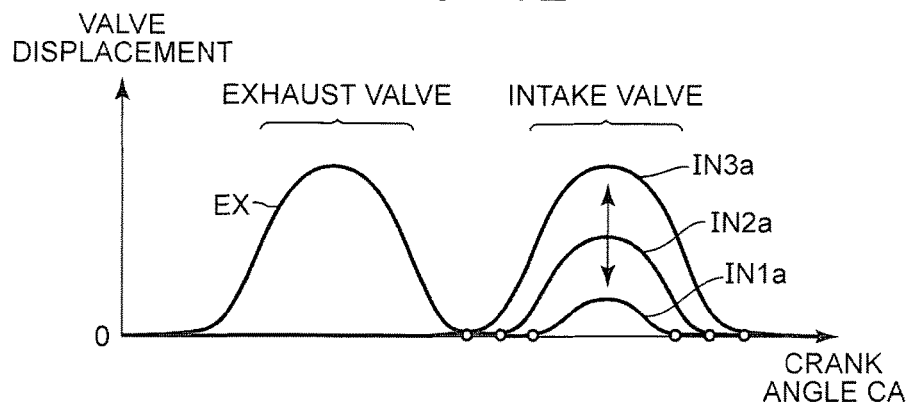
FIG. 12 is a graph that shows the correlation between a crank angle and a valve displacement that is achieved by a VVL device that is able to change the operation characteristic of each intake valve in three steps.

FIG. 12 is a graph that shows the correlation between a crank angle and a valve displacement that is achieved by a VVL device 400A that is able to change the operation characteristic of each intake valve 118 in three steps. The VVL device 400A is configured to be able to change the operation characteristic to any one of first to third characteristics. The first characteristic is indicated by a waveform IN1$a$. The second characteristic is indicated by a waveform IN2$a$. The valve lift and the valve operating angle of the second characteristic are larger than the valve lift and the valve operating angle of the first characteristic. The third characteristic is indicated by a waveform IN3$a$. The valve lift and the valve operating angle of the third characteristic are larger than the valve lift and the valve operating angle of the second characteristic.

Figure 13:
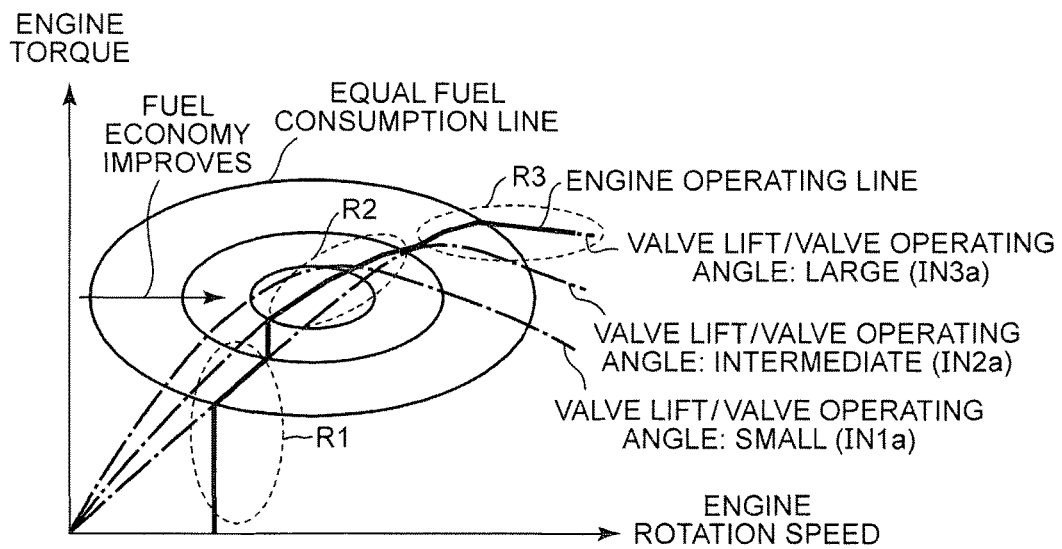
FIG. 13 is a graph that shows an operating line of an engine including the VVL device having the operation characteristics shown in FIG. 12.

FIG. 13 is a graph that shows an operating line of an engine 100A including the VVL device 400A having the operation characteristics shown in FIG. 12. In FIG. 13, the abscissa axis represents engine rotation speed, and the ordinate axis represents engine torque. The alternate long and short dashed lines in FIG. 13 indicate torque characteristics corresponding to the first to third characteristics (IN1$a$ to IN3$a$). The circles indicated by the continuous line in FIG. 13 indicate equal fuel consumption lines. Each equal fuel consumption line is a line connecting points at which a fuel consumption amount is equal. The fuel economy improves as approaching the center of the circles. The engine 100A is basically operated along the engine operating line indicated by the continuous line in FIG. 13.

In a low rotation speed region indicated by the region R1, it is important to reduce shock at engine start-up. In addition, introduction of exhaust gas recirculation (EGR) gas is stopped, and fuel economy is improved by using the Atkinson cycle. The third characteristic (IN3$a$) is selected as the operation characteristic of each intake valve 118 so that the valve lift and valve operating angle increase. In an intermediate rotation speed region indicated by the region R2, fuel economy is improved by increasing the amount of introduction of EGR gas. Thus, the second characteristic (IN2$a$) is selected as the operation characteristic of each intake valve 118 so that the valve lift and the valve operating angle are intermediate.

That is, when the valve lift and valve operating angle of each intake valve 118 are large (third characteristic), improvement in fuel economy by using the Atkinson cycle is given a higher priority than improvement in fuel economy by introduction of EGR gas. On the other hand, when the intermediate valve lift and valve operating angle are selected (second characteristic), improvement in fuel economy by introduction of EGR gas is given a higher priority than improvement in fuel economy by using the Atkinson cycle.

In a high rotation speed region indicated by the region R3, a large amount of air is introduced into each cylinder by the inertia of intake air, and the output performance is improved by increasing an actual compression ratio. The third characteristic (IN3a) is selected as the operation characteristic of each intake valve 118 so that the valve lift and valve operating angle increase.

When the engine 100A is operated at a high load in the low rotation speed region, when the engine 100A is started up at an extremely low temperature or when a catalyst is warmed up, the first characteristic (IN1a) is selected as the operation characteristic of each intake valve 118 so that the valve lift and the valve operating angle decrease. In this way, the valve lift and the valve operating angle are determined on the basis of the operating state of the engine 100A.

Figure 14:
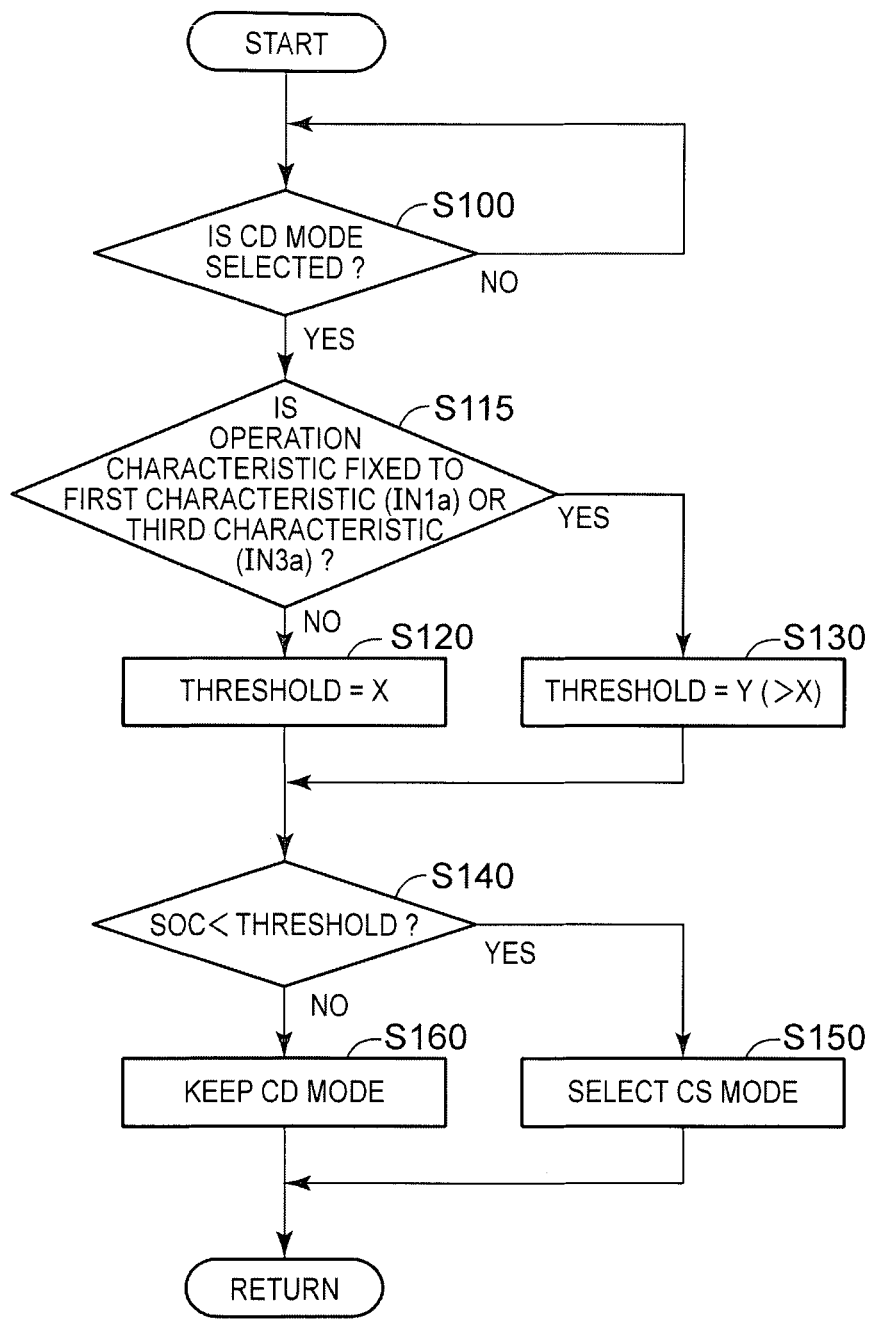
FIG. 14 is a flowchart that shows the control structure of traveling control that is executed by the controller that controls the VVL device having the operation characteristics shown in FIG. 12.

FIG. 14 is a flowchart that shows the control structure of traveling control that is executed by a controller 200A that controls the VVL device 400A having the operation characteristics shown in FIG. 12. Referring to FIG. 14, S100 and S120 to S160 are similar to those in the flowchart shown in FIG. 11, so the description will not be repeated.

When it is determined in S100 that the CD mode is selected (YES in S100), the controller 200A determines whether the operation characteristic of each intake valve 118 is fixed to the first characteristic (IN1a) or the third characteristic (IN3a) (S115). That is, the controller 200A determines whether the operation characteristic of each intake valve 118 is unchangeable from the first characteristic (IN1a) or the third characteristic (IN3a).

When it is determined that the operation characteristic of each intake valve 118 is not fixed to the first characteristic (IN1a) or the third characteristic (IN3a) (NO in S115), the controller 200A sets the predetermined value X for the threshold for switching from the CD mode to the CS mode (S120). When it is determined that the operation characteristic of each intake valve 118 is fixed to the first characteristic (IN1a) or the third characteristic (IN3a) (YES in S115), the controller 200A sets the predetermined value Y higher than the predetermined value X for the threshold for switching from the CD mode to the CS mode (S130).

With the above configuration, because the operation characteristic, that is, the valve lift and valve operating angle, of each intake valve 118 is limited to three characteristics, it is possible to reduce a time that is required to adapt control parameters for controlling the operating state of the engine 100 in comparison with the case where the valve lift and valve operating angle of each intake valve 118 continuously change. In addition, it is possible to reduce torque that is required of the actuator for changing the valve lift and valve operating angle of each intake valve 118, so it is possible to reduce the size and weight of the actuator. Therefore, it is possible to reduce the manufacturing cost of the actuator.

There is a region in which the output of the engine 100 is easy to decrease when the operation characteristic of each intake valve 118 is fixed to the first characteristic or the third characteristic. Thus, the CS mode is selected only when the operation characteristic of each intake valve 118 is fixed to the first characteristic or the third characteristic, so it is possible to suppress excessive limitations on travel of the hybrid vehicle 1 in the CD mode.

Figure 15:
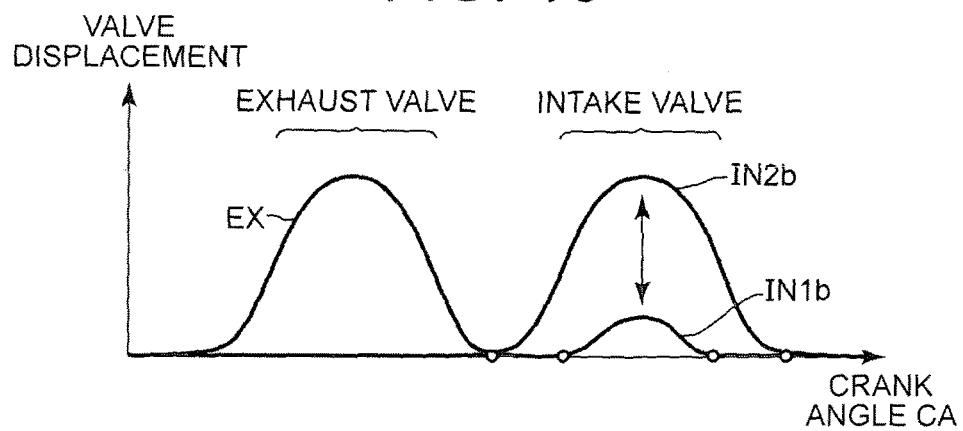
FIG. 15 is a graph that shows the correlation between a crank angle and a valve lift that is achieved by a VVL device that is able to change the operation characteristic of each intake valve in two steps.

FIG. 15 is a graph that shows the correlation between a crank angle and a valve displacement that is achieved by a VVL device 400B that is able to change the operation characteristic of each intake valve 118 in two steps. The VVL device 400B is configured to be able to change the operation characteristic to one of the first and second characteristics. The first characteristic is indicated by a waveform IN1b. The second characteristic is indicated by a waveform IN2b. The valve lift and the valve operating angle in the second characteristic are larger than the valve lift and the valve operating angle in the first characteristic.

With such a configuration, because the operation characteristic, that is, the valve lift and the valve operating angle, of each intake valve 118 is limited to two characteristics, it is possible to further reduce a time that is required to adapt control parameters for controlling the operating state of the engine 100. In addition, it is possible to further simplify the configuration of the actuator. The operation characteristic, that is, the valve lift and valve operating angle, of each intake valve 118 is not limited to the case where the operation characteristic is changed in two steps or in three steps. The operation characteristic may be changed in any number of steps larger than or equal to four steps.

First Alternative Embodiment

Figure 16:
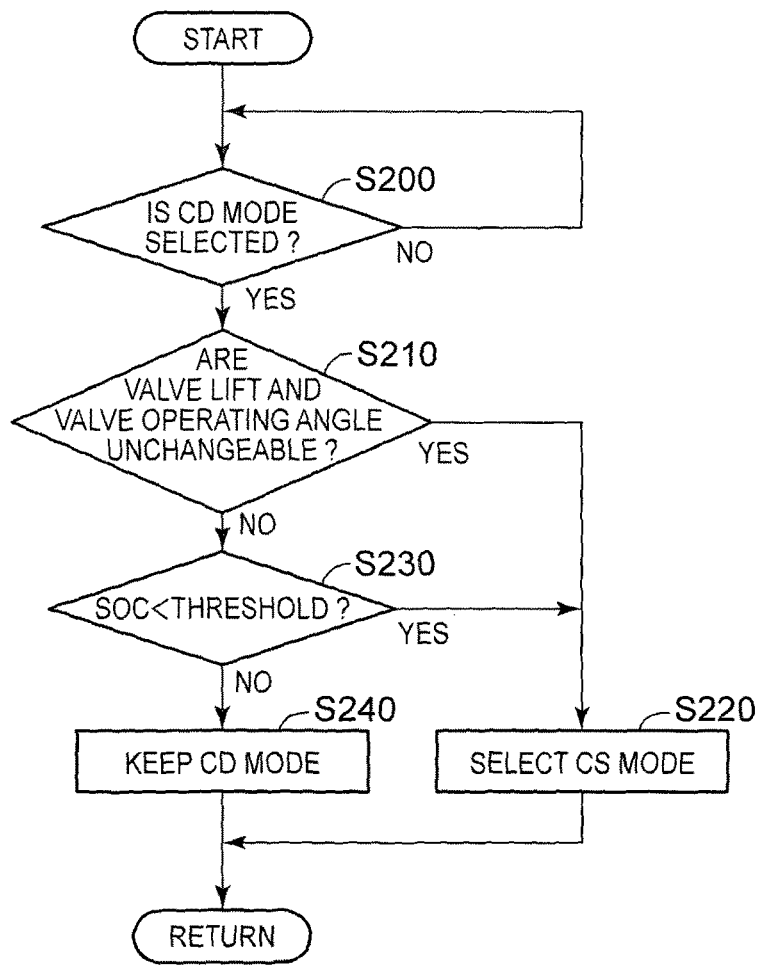
FIG. 16 is a flowchart that shows the control structure of traveling control that is executed by a controller according to a first alternative embodiment to the embodiment of the invention.

FIG. 16 is a flowchart that shows the control structure of traveling control that is executed by a controller 200B according to a first alternative embodiment to the embodiment of the invention. The other configuration of the controller 200B according to the first alternative embodiment to the embodiment is similar to that of the embodiment.

Referring to FIG. 16, the controller 200B determines in S200 whether the CD mode is selected. When it is determined that the CD mode is not selected (NO in S200), the controller 200B waits until the CD mode is selected.

When it is determined that the CD mode is selected (YES in S200), the controller 200B determines whether the valve lift and valve operating angle of each intake valve 118 are unchangeable (S210). When it is determined that the valve lift and valve operating angle of each intake valve 118 are unchangeable (YES in S210), the controller 200B selects the CS mode (S220).

When it is determined that the valve lift and valve operating angle of each intake valve 118 are changeable (NO in S210), the controller 200B determines whether the SOC of the electrical storage device B is lower than the threshold (S230). When it is determined that the SOC of the electrical storage device B is lower than the threshold (YES in S230), the controller 200B selects the CS mode (S220). When it is determined that the SOC of the electrical storage device B is higher than or equal to the threshold (NO in S230), the controller 200B keeps the CD mode (S240).

As described above, in this first alternative embodiment to the embodiment, when at least one of the valve lift or valve operating angle of each intake valve 118 becomes unchangeable in the case where the CD mode is selected, the controller 200B switches to the CS mode. Thus, the CS mode is immediately selected when at least one of the valve lift or valve operating angle of each intake valve 118 is unchangeable, so it is possible to suppress consumption of the SOC in the CD mode.

Second Alternative Embodiment

Figure 17:
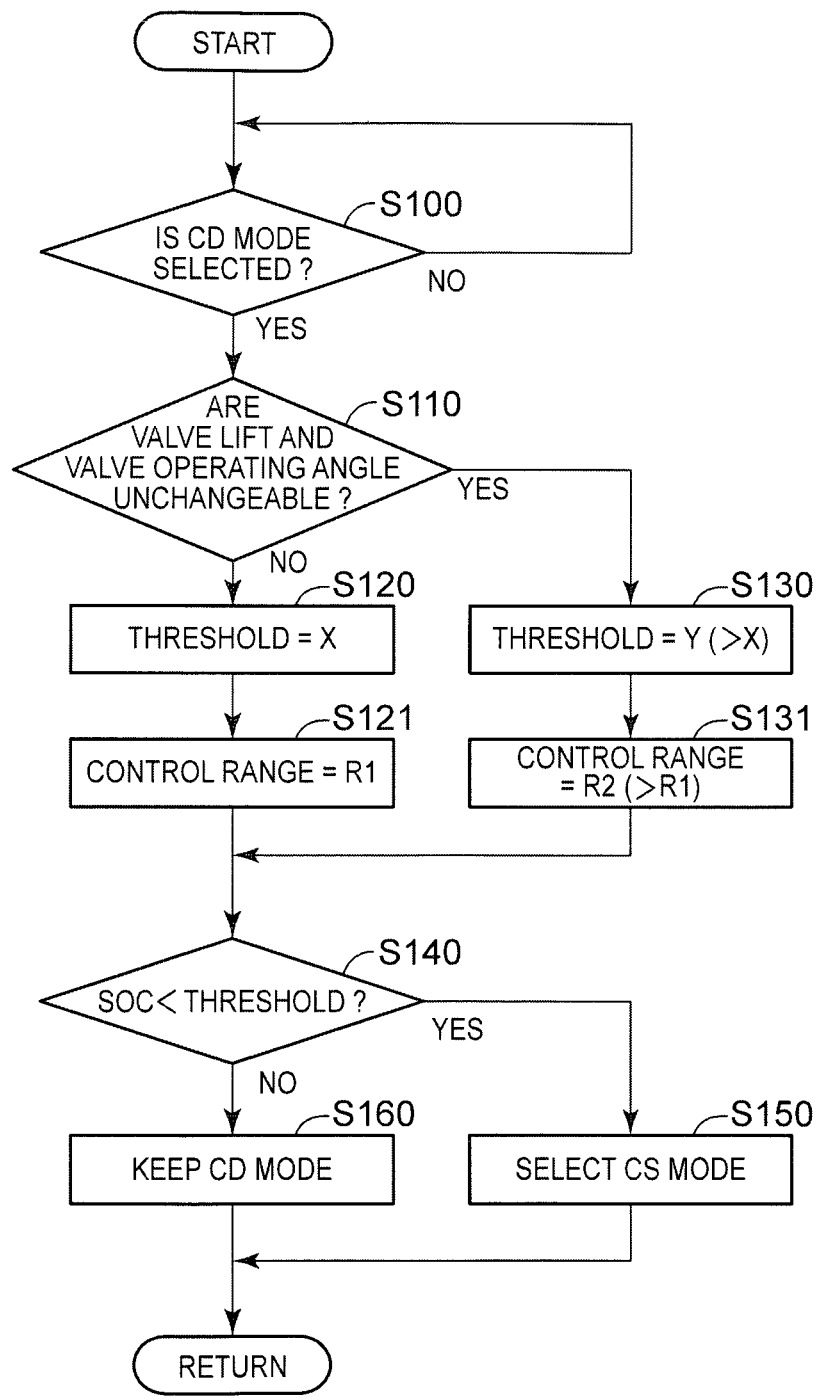
FIG. 17 is a flowchart that shows the control structure of traveling control that is executed by a controller according to a second alternative embodiment to the embodiment of the invention.

FIG. 17 is a flowchart that shows the control structure of traveling control that is executed by a controller 200C according to a second alternative embodiment to the embodiment of the invention. The other configuration of the controller 200C according to the second alternative embodiment to the embodiment is similar to that of the embodiment.

Referring to FIGS. 17, S100 to S120, S130, and S140 to S160 are similar to those of the embodiment, so the description will not be repeated. When the predetermined value X is set for the threshold for switching from the CD mode to the CS mode in S120, the controller 200C sets a control range of the SOC to a predetermined range R1 (S121). The control range of the SOC is a range in which the SOC is kept in the CS mode. The controller 200C controls the charge/discharge amount of the electrical storage device B so as to keep the SOC within the set control range.

When the predetermined value Y is set for the threshold for switching from the CD mode to the CS mode in S130, the controller 200C sets the control range of the SOC to a predetermined range R2 wider than the predetermined range R1 (S131). Thus, when at least one of the valve lift or valve operating angle of each intake valve 118 is unchangeable, constraints that arise in order to keep the SOC within the control range in the CS mode are eased. Thus, it is possible to more easily utilize the driving force of the motor generator MG2 for propelling the hybrid vehicle 1 by actively using the charge/discharge capacity of the electrical storage device B.

As described above, in this second alternative embodiment to the embodiment, the controller 200C keeps the SOC of the electrical storage device B within the predetermined range in the CS mode, and sets the predetermined range such that the predetermined range at the time when at least one of the valve lift or valve operating angle of each intake valve 118 is unchangeable is wider than the predetermined range at the time when the corresponding at least one of the valve lift or valve operating angle of each intake valve 118 is changeable.

Thus, when at least one of the valve lift or valve operating angle of each intake valve 118 is unchangeable, it is possible to more easily utilize the driving force of the motor generator MG2 for propelling the hybrid vehicle 1 by allowing fluctuations in SOC as compared to when the corresponding at least one of the valve lift or valve operating angle of each intake valve 118 is changeable. Thus, it is possible to flexibly carry out retreat traveling in which the hybrid vehicle 1 travels in a state where the output of the engine 100 has decreased.

Third Alternative Embodiment

FIG. 18 is a flowchart that shows the control structure of traveling control that is executed by a controller 200D according to a third alternative embodiment to the embodiment of the invention. The other configuration of the controller 200D according to the third alternative embodiment to the embodiment is similar to that of the embodiment.

Referring to FIGS. 18, S100 to S120, S130, and S140 to S160 are similar to those of the embodiment, so the description will not be repeated. When the predetermined value X is set for the threshold for switching from the CD mode to the CS mode in S120, the controller 200D sets a control center of the SOC to a predetermined value C1 (S122). As an example, the threshold (predetermined value X) is set as the predetermined value C1. The control center of the SOC is the center of a range in which the SOC is kept in the CS mode. The controller 200D controls the charge/discharge amount of the electrical storage device B such that the center of the range in which the SOC is kept becomes the set control center.

When the predetermined value Y is set for the threshold for switching from the CD mode to the CS mode in S130, the controller 200D sets the control center of the SOC to a predetermined value C2 that is a value higher than or equal to the threshold (predetermined value Y) (S132). That is, the control center is set to a value higher than or equal to the SOC for switching from the CD mode to the CS mode. Thus, it is possible to keep the SOC in the CS mode higher.

As described above, in this third alternative embodiment to the embodiment, the controller 200D keeps the SOC of the electrical storage device B within the predetermined range in the CS mode, and sets the center of the predetermined range such that the center of the predetermined range at the time when at least one of the valve lift or valve operating angle of each intake valve 118 is unchangeable is higher than or equal to the SOC for switching from the CD mode to the CS mode.

Thus, it is possible to keep the SOC in the CS mode higher. As a result, it is possible to suppress deterioration of traveling performance by compensating for a decrease in the output of the engine 100 with the driving force of the motor generator MG2 for propelling the hybrid vehicle 1.

In the above-described embodiment, the case where both the valve lift and valve operating angle of each intake valve 118 are changed is described. The invention is also applicable to a configuration that only the valve lift of each intake valve 118 is changeable or a configuration that only the valve operating angle of each intake valve 118 is changeable. With the configuration that one of the valve lift and valve operating angle of each intake valve 118 is changeable as well, similar advantageous effects to those in the case where both the valve lift and valve operating angle of each intake valve 118 are changeable. The configuration that one of the valve lift and valve operating angle of each intake valve 118 is changeable may be implemented by utilizing a known technique.

In the above-described embodiment, the series-parallel hybrid vehicle that is able to transmit the power of the engine 100 by distributing the power of the engine 100 to the drive wheels 6 and the motor generators MG1, MG2 by the power split device 4. The invention is also applicable to a hybrid vehicle of another type. That is, the invention is also applicable to, for example, a so-called series hybrid vehicle in which the engine 100 is only used to drive the motor generator MG1 and the driving force of the vehicle is generated by only the motor generator MG2, a hybrid vehicle in which only regenerative energy within kinetic energy generated by the engine 100 is recovered as electric energy, a motor-assist hybrid vehicle in which the engine is used as a main power source and a motor, where necessary, assists, or the like. The invention is also applicable to a hybrid vehicle that travels by using the power of only the engine while the motor is separated.

A method of supplying electric power from the system power supply 600 to the charging port 510 is not limited to a power transfer method in a contact manner in which the connector 610 connected to the system power supply 600 contacts the charging port 510. For example, a power transfer method in a noncontact manner, such as power transfer using electromagnetic induction, power transfer using an electromagnetic wave and power transfer based on a so-called resonance method, may be employed.

In the above description, the engine 100 corresponds to one example of an "internal combustion engine" according to the invention, and the motor generator MG2 corresponds to one example of a "rotary electric machine" according to the invention. The VVL device 400 corresponds to one example of a "variable valve actuating device" according to the invention.

The embodiment of the invention and the first to third alternative embodiments to the embodiment of the invention are described above; however, the configurations of the embodiment and first to third alternative embodiments may be combined with each other as needed.

The embodiment described above should be regarded as only illustrative in every respect and not restrictive. The scope of the invention is defined by the appended claims rather than the description of the above embodiment. The scope of the invention is intended to encompass all modifications within the scope of the appended claims and equivalents thereof.

The invention claimed is:

1. A hybrid vehicle comprising:
an internal combustion engine including a variable valve actuating device configured to change an operation characteristic of an intake valve;
an electrical storage device configured to be charged;
a rotary electric machine configured to generate driving force for propelling the hybrid vehicle by using electric power that is supplied from the electrical storage device; and
a controller configured to
cause the hybrid vehicle to travel in a selected one of a charge sustaining mode or a charge depleting mode, the charge sustaining mode being a mode in which a state of charge of the electrical storage device is kept within a predetermined range, the charge depleting mode being a mode in which consumption of the state of charge is given a higher priority as compared to the charge sustaining mode, and
change a switching condition for switching from the charge depleting mode to the charge sustaining mode such that a first state of charge is higher than a second state of charge, the first state of charge being a state of charge at which the controller switches from the charge depleting mode to the charge sustaining mode at the time when the operation characteristic of the intake valve is unchangeable to a desired operation characteristic, the second state of charge being a state of charge at which the controller switches from the charge depleting mode to the charge sustaining mode at the time when the operation characteristic of the intake valve is changeable to the desired operation characteristic.

2. The hybrid vehicle according to claim 1, wherein
the controller is configured to, when the state of charge decreases to a predetermined state of charge at the time when the charge depleting mode is selected, switch from the charge depleting mode to the charge sustaining mode, and
the controller is configured to set the predetermined state of charge such that the predetermined state of charge at the time when the operation characteristic of the intake valve is unchangeable to the desired operation characteristic is higher than the predetermined state of charge at the time when the operation characteristic of the intake valve is changeable to the desired operation characteristic.

3. The hybrid vehicle according to claim 1, wherein
the controller is configured to, when the operation characteristic of the intake valve becomes unchangeable to the desired operation characteristic at the time when the charge depleting mode is selected, switch from the charge depleting mode to the charge sustaining mode.

4. The hybrid vehicle according to claim 1, wherein
the controller is configured to change the switching condition for switching from the charge depleting mode to the charge sustaining mode so as to, (a) when the variable valve actuating device has a failure, switch from the charge depleting mode to the charge sustaining mode at the first state of charge, and, (b) when the variable valve actuating device is normal, switch from the charge depleting mode to the charge sustaining mode at the second state of charge.

5. The hybrid vehicle according to claim 1, wherein
the controller is configured to set the predetermined range such that the predetermined range at the time when the operation characteristic of the intake valve is unchangeable to the desired operation characteristic is wider than the predetermined range at the time when the operation characteristic of the intake valve is changeable to the desired operation characteristic.

6. The hybrid vehicle according to claim 1, wherein
the controller is configured to set a center of the predetermined range such that the center of the predetermined range at the time when the operation characteristic of the intake valve is unchangeable to the desired operation characteristic is higher than or equal to the state of charge at which the controller switches from the charge depleting mode to the charge sustaining mode at the time when the operation characteristic of the intake valve is changeable to the desired operation characteristic.

7. The hybrid vehicle according to claim 1, wherein
the variable valve actuating device is configured to change the operation characteristic of the intake valve to any one of a first characteristic, a second characteristic and a third characteristic,
at least one of a valve lift of the intake valve or a valve operating angle of the intake valve in the second characteristic is larger than the corresponding at least one of a valve lift of the intake valve or a valve operating angle of the intake valve in the first characteristic, and
at least one of a valve lift of the intake valve or a valve operating angle of the intake valve in the third characteristic is larger than the corresponding at least one of the valve lift of the intake valve or the valve operating angle of the intake valve in the second characteristic.

8. The hybrid vehicle according to claim 7, wherein
the controller is configured to, when the operation characteristic of the intake valve is unchangeable to the first characteristic or the third characteristic at the time when the charge depleting mode is selected, switch from the charge depleting mode to the charge sustaining mode.

9. The hybrid vehicle according to claim 1, wherein
the variable valve actuating device is configured to change the operation characteristic of the intake valve to one of a first characteristic and a second characteristic, and
at least one of a valve lift of the intake valve or a valve operating angle of the intake valve in the second characteristic is larger than the corresponding at least one of a valve lift of the intake valve or a valve operating angle of the intake valve in the first characteristic.

10. A controller for a hybrid vehicle, the hybrid vehicle including an internal combustion engine, an electrical storage device and a rotary electric machine,
the internal combustion engine including a variable valve actuating device configured to change an operation characteristic of an intake valve,
the electrical storage device being configured to be charged, and the rotary electric machine being configured to generate driving force for propelling the hybrid vehicle by using electric power that is supplied from the electrical storage device, the controller comprising:
- a mode control unit configured to
  - change a switching condition for switching from a charge depleting mode to a charge sustaining mode such that a first state of charge is higher than a second state of charge,
  - the first state of charge being a state of charge at which the controller switches from the charge depleting mode to the charge sustaining mode at the time when the operation characteristic of the intake valve is unchangeable to a desired operation characteristic,
  - the second state of charge being a state of charge at which the controller switches from the charge depleting mode to the charge sustaining mode at the time when the operation characteristic of the intake valve is changeable to the desired operation characteristic, and
- select one of the charge sustaining mode and the charge depleting mode; and a traveling control unit configured to cause the hybrid vehicle to travel in the mode selected by the mode control unit,
- the charge sustaining mode being a mode in which a state of charge of the electrical storage device is kept within a predetermined range, and
- the charge depleting mode being a mode in which consumption of the state of charge is given a higher priority as compared to the charge sustaining mode.

11. A control method for a hybrid vehicle, the hybrid vehicle including an internal combustion engine, an electrical storage device, a rotary electric machine and a controller, the internal combustion engine including a variable valve actuating device configured to change an operation characteristic of an intake valve, the electrical storage device being configured to be charged, and the rotary electric machine being configured to generate driving force for propelling the hybrid vehicle by using electric power that is supplied from the electrical storage device, the control method comprising:

changing, by the controller, a switching condition for switching from a charge depleting mode to a charge sustaining mode such that a first state of charge is higher than a second state of charge, the first state of charge being a state of charge at which the controller switches from the charge depleting mode to the charge sustaining mode at the time when the operation characteristic of the intake valve is unchangeable to a desired operation characteristic, the second state of charge being a state of charge at which the controller switches from the charge depleting mode to the charge sustaining mode at the time when the operation characteristic of the intake valve is changeable to the desired operation characteristic; and causing, by the controller, the hybrid vehicle to travel in a selected one of the charge sustaining mode and the charge depleting mode, the charge sustaining mode being a mode in which a state of charge of the electrical storage device is kept within a predetermined range, the charge depleting mode being a mode in which consumption of the state of charge is given a higher priority as compared to the charge sustaining mode.

* * * * *